US011215205B2

(12) United States Patent
Pastori

(10) Patent No.: US 11,215,205 B2
(45) Date of Patent: Jan. 4, 2022

(54) FILTER FOR HYDRAULIC FLUIDS FOR HYDRAULIC CIRCUITS AND PROCESS OF MAKING THE SAME

(71) Applicant: MP FILTRI S.p.A., Pessano con Bornago (IT)

(72) Inventor: Claudio Pastori, Lesmo (IT)

(73) Assignee: MP Filtri S.p.A., Pessano con Bornago (IT)

( * ) Notice: Subject to any disclaimer, the term of this patent is extended or adjusted under 35 U.S.C. 154(b) by 76 days.

(21) Appl. No.: 15/224,337

(22) Filed: Jul. 29, 2016

(65) Prior Publication Data
US 2017/0030384 A1 Feb. 2, 2017

(30) Foreign Application Priority Data

Jul. 30, 2015 (IT) .................. 102015000040473

(51) Int. Cl.
*B01D 35/30* (2006.01)
*B01D 29/13* (2006.01)
(Continued)

(52) U.S. Cl.
CPC ............ *F15B 21/041* (2013.01); *B01D 29/11* (2013.01); *B01D 29/13* (2013.01); *B01D 35/02* (2013.01);
(Continued)

(58) Field of Classification Search
CPC ........ F15B 21/041; F15B 21/04; B01D 29/11; B01D 29/13; B01D 35/02; B01D 35/306;
(Continued)

(56) References Cited

U.S. PATENT DOCUMENTS 7,252,759 B2  8/2007  Evanovich
7,332,009 B2  2/2008  Casey et al.
(Continued)

FOREIGN PATENT DOCUMENTS

DE  102004029641 B4  1/2006
DE  102009050587 A1  4/2011
(Continued)

OTHER PUBLICATIONS

Galiana Lopez, Search Report and Written Opinion for application No. ITMI20140888, dated Feb. 16, 2015, 7 pgs.
(Continued)

*Primary Examiner* — Bobby Ramdhanie
*Assistant Examiner* — Donovan Bui-Huynh
(74) *Attorney, Agent, or Firm* — Fish & Richardson P.C.

(57) ABSTRACT

A filter for hydraulic fluids including a container defining inside a housing compartment fluidically communicating with an inlet and an outlet associated with and a filtering cartridge, and partitioning the compartment in first and second chambers. The cartridge is configured and positioned for determining the filtering of the hydraulic fluid from the inlet which flows from the first to the second chambers. The container exhibits an engagement portion projecting inside the housing compartment and defining a collar having an outer coupling lateral surface, while the filtering cartridge exhibits a respective engagement portion defining a respective collar exhibiting an inner coupling lateral surface configured for engaging outside the outer coupling surface of the container. The coupling surface of the engagement portion of the container exhibits a polygonal cross-section; the inner coupling surface of the engagement portion of the cartridge is at least partially countershaped to the coupling surface of the container.

20 Claims, 15 Drawing Sheets

(51) Int. Cl.
*F15B 21/041* (2019.01)
*B01D 29/11* (2006.01)
*B01D 35/02* (2006.01)

(52) U.S. Cl.
CPC ........ *B01D 35/306* (2013.01); *B01D 2201/29* (2013.01); *B01D 2201/296* (2013.01); *B01D 2201/4046* (2013.01); *B01D 2201/4061* (2013.01); *B01D 2201/4076* (2013.01)

(58) Field of Classification Search
CPC ...... B01D 2201/296; B01D 2201/4046; B01D 2201/4061; B01D 2201/4076; B01D 2201/184; B01D 27/08; B01D 29/03; B01D 29/21; B01D 29/31; B01D 35/147; B01D 39/10; B01D 29/232; B01D 29/54; B01D 35/153; B01D 35/16; B01D 29/118; B01D 2201/0415; B01D 2201/305; B01D 2201/4015; B01D 2201/4048; B01D 2201/0407; B01D 2201/12; B01D 2201/127; B01D 2201/162; B01D 2201/28; B01D 2201/295; B01D 2201/40; B01D 2201/4023; B01D 2201/52; B01D 2201/60; B01D 29/96; B01D 35/30; B01D 35/31; B01D 36/003; B01D 37/025; B01D 29/52; B01D 2201/4084; B01D 2201/291; B01D 2201/0453; B01D 2201/24; B01D 2201/304; B01D 2201/306; B01D 2265/027; B01D 2265/029; B01D 2265/05; B01D 2271/02; B01D 2279/60; B01D 2313/04; B01D 2313/105; B01D 2313/20; B01D 2313/44; B01D 29/33; B01D 29/58; B01D 29/902; B01D 35/005; B01D 46/0005; B01D 46/2411; B01D 63/067; B01D 2201/298; B01D 27/00; B01D 29/114; B01D 29/15; B01D 29/90; B01D 36/006; F16J 15/0881; F16L 23/20; A47J 31/605; C02F 1/003; C02F 1/283; C02F 2201/006; C02F 2301/043; F01M 11/03; F01M 2001/1064; F01M 37/36; F01M 37/42; F02M 37/46; F02M 2200/27; F02M 37/22; F02M 37/36; F02M 37/42

See application file for complete search history.

(56) References Cited

U.S. PATENT DOCUMENTS

| | | | |
|---|---|---|---|
| 7,591,490 | B1 | 9/2009 | Wilkendorf |
| 7,604,738 | B2 | 10/2009 | Evanovich |
| 7,883,559 | B2 | 2/2011 | Herges et al. |
| D634,398 | S | 3/2011 | Ickes et al. |
| 8,127,806 | B2 | 3/2012 | Kuhnrich |
| D658,740 | S | 5/2012 | Ickes et al. |
| 8,245,851 | B2 | 8/2012 | Hawkins et al. |
| 8,840,787 | B2 | 9/2014 | Sann et al. |
| 9,044,695 | B2 | 6/2015 | Sann et al. |
| 9,581,245 | B2* | 2/2017 | Xi ............ F16L 23/20 |
| 2003/0173286 | A1 | 9/2003 | Evanovich et al. |
| 2005/0029171 | A1 | 2/2005 | Evanovich et al. |
| 2005/0120687 | A1 | 6/2005 | Casey et al. |
| 2006/0254229 | A1 | 11/2006 | Schrage et al. |
| 2008/0017643 | A1 | 1/2008 | Kuhnrich |
| 2009/0071111 | A1 | 3/2009 | Lundgren et al. |
| 2009/0134087 | A1 | 5/2009 | Hawkins et al. |
| 2009/0223186 | A1 | 9/2009 | Herges et al. |
| 2009/0321339 | A1* | 12/2009 | Suzuki ........ B01D 29/21 210/233 |
| 2012/0018359 | A1 | 1/2012 | Sann et al. |
| 2012/0181224 | A1 | 7/2012 | Rapin |
| 2012/0223006 | A1 | 9/2012 | Sann et al. |
| 2012/0240767 | A1 | 9/2012 | Casey et al. |
| 2013/0140227 | A1 | 6/2013 | Stehle et al. |
| 2013/0228504 | A1* | 9/2013 | McElroy ........ B01D 35/147 210/236 |
| 2014/0083923 | A1 | 3/2014 | Sann et al. |
| 2017/0266592 | A1* | 9/2017 | Johnson ........ B01D 29/31 |
| 2019/0070532 | A1* | 3/2019 | Thoms ........ B01D 29/31 |

FOREIGN PATENT DOCUMENTS

| | | |
|---|---|---|
| EP | 1088581 B1 | 8/2006 |
| EP | 1750825 B1 | 3/2008 |
| WO | WO2002045819 A1 | 6/2002 |
| WO | WO2015173777 A1 | 11/2015 |

OTHER PUBLICATIONS

Skowronski, Search Report and Written Opinion for application No. ITUB20152615, dated Mar. 17, 2016, 7 pgs.

* cited by examiner

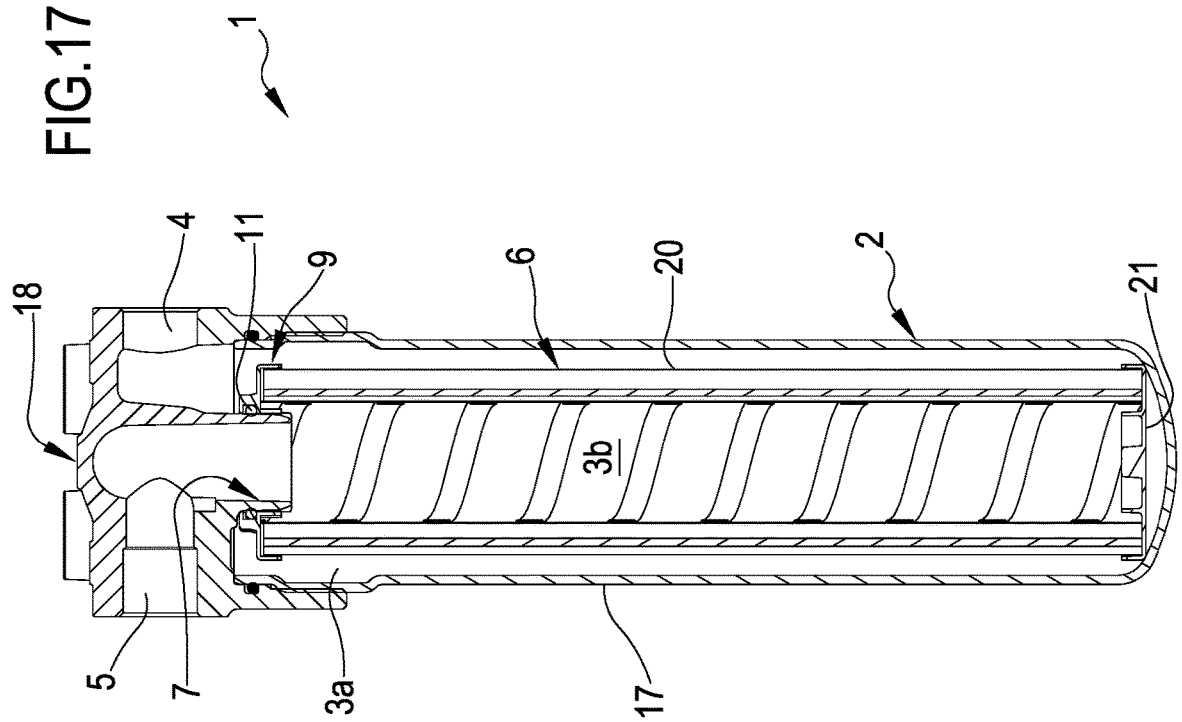
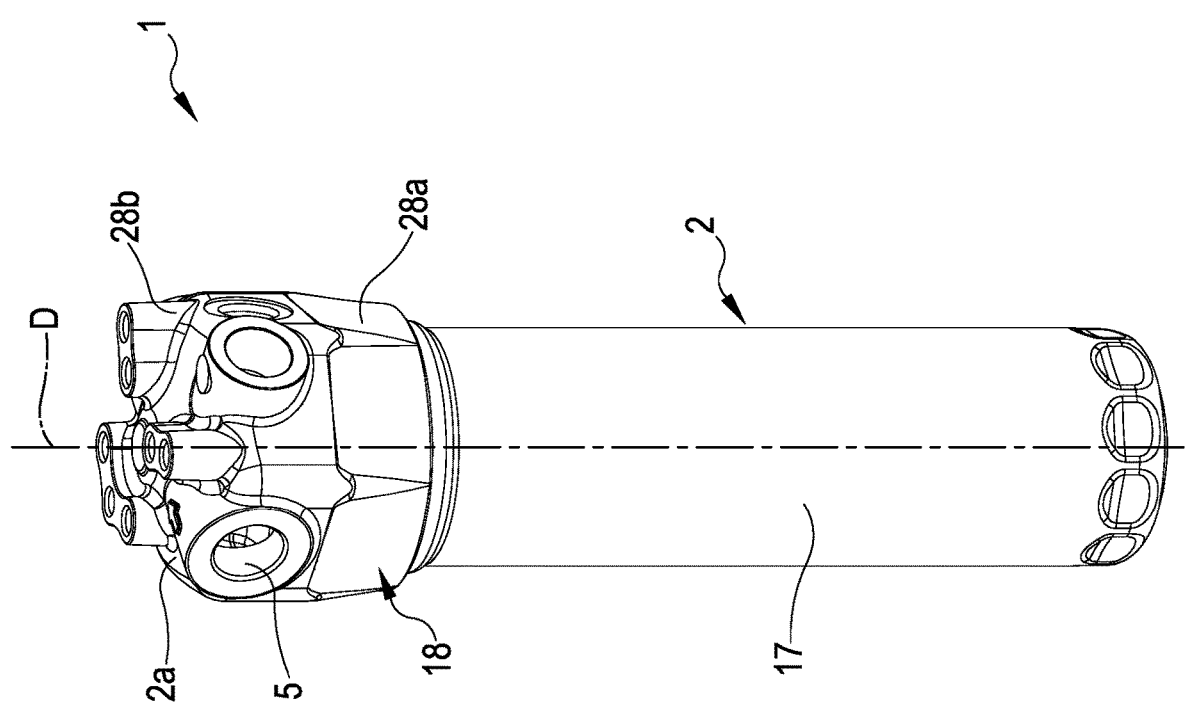

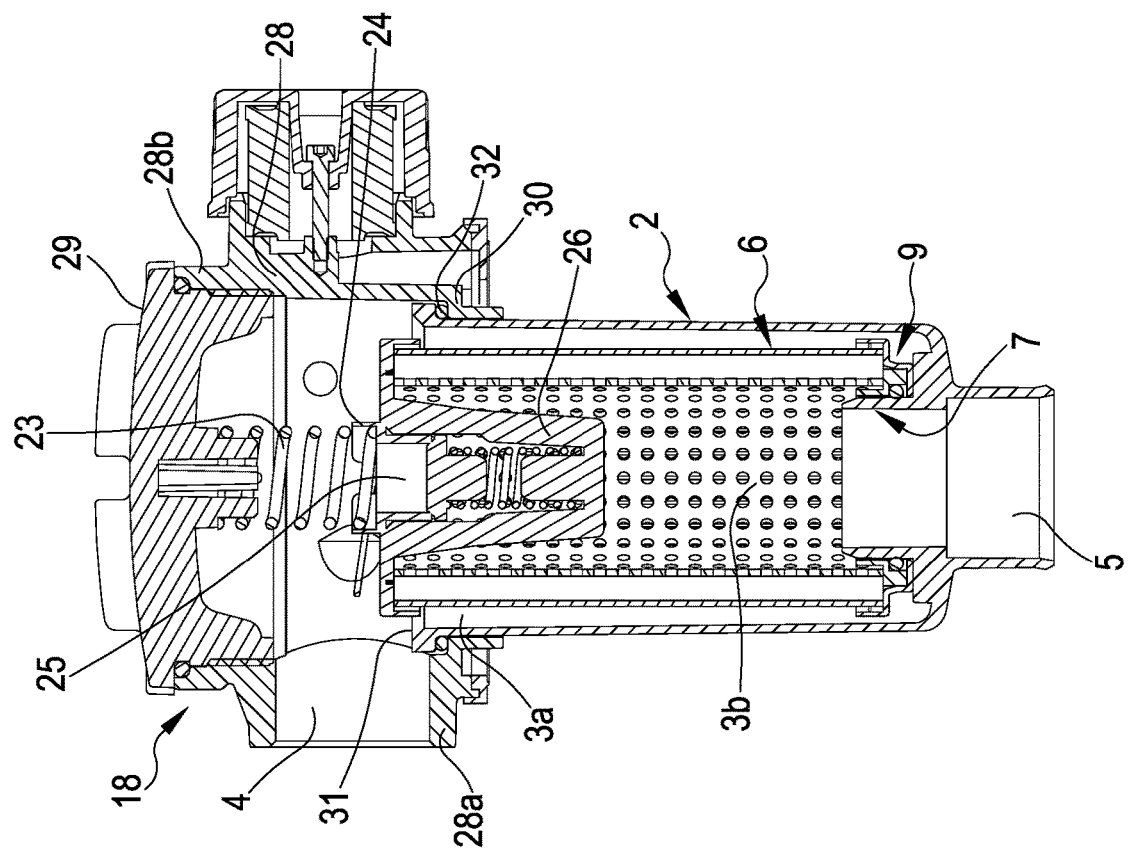
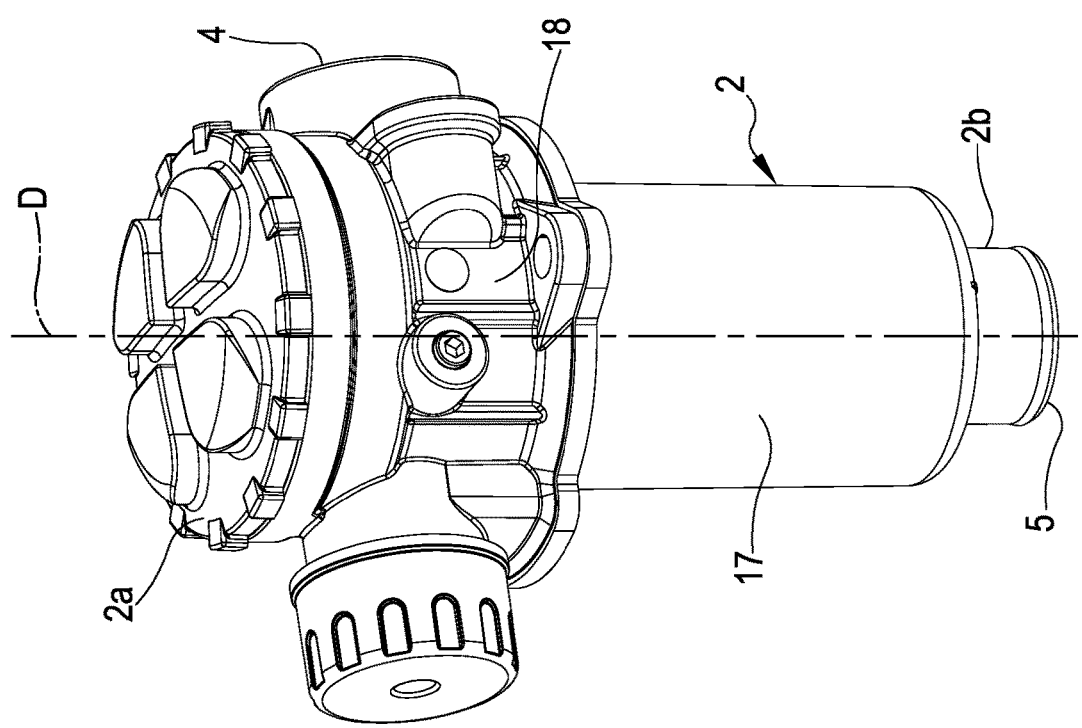
FIG.25
FIG.24

FILTER FOR HYDRAULIC FLUIDS FOR HYDRAULIC CIRCUITS AND PROCESS OF MAKING THE SAME

CROSS-REFERENCE TO RELATED APPLICATION

This application claims priority to Italian Patent Application No. 102015000040473 filed Jul. 30, 2015, which is incorporated by reference herein in its entirety.

FIELD OF THE INVENTION

The present invention refers to a filter for hydraulic fluids for hydraulic circuits and a process of making the same. Particularly, the filter finds application in lubricating systems or filtering systems of the submersible, semi-submersible or pressurized type. For example, the filter can be used in industrial plants, construction machines, agricultural machines, transport and lifting vehicles.

BACKGROUND

As it is known, the hydraulic filters are widely used in the lubrication and/or collecting circuits for substantially defining the means for intercepting and retaining residuals present in working fluids. The main cause of the anomalies which can be found in hydraulic systems is often attributable to the presence of contaminant elements in the fluid: the oil is contaminated by the presence of a gas (for example air mixed with the fluid) by the infiltration of water, or by the presence of solid particles. The proper operation of the hydraulic filters is fundamental because enables to better exploit the industrial plants and/or the operative machines in terms of performance, energy consumption and pollution. A correct oil filtering can ensure high performances, reduced consumption and pollution. Further, a suitable filtering enables to keep constant over time the design requirements in order to define an effectively controllable system having low operating costs. Such characteristics can be obtained by using filtering systems minimizing or even eliminating the presence of contaminants in the hydraulic system. It is particularly interesting for the present discussion the hydraulic filters on a return line; such filters are placed on return lines of a circuit and are used as safety filters having the object of protecting the working devices, for example motors and pumps, from possible contaminants present in the fluid. Generally, the oil circuits are provided with storage reservoirs connected to motors and/or pumps: the reservoir substantially defines the oil storage unit which enables the pump and/or motor to use the desired fluid quantity. For ensuring the proper operation of the elements active on the reservoir the oil inside this latter is required to be "pure", in other words substantially devoid of solid, liquid and gas type contaminants. Therefore, it is known to use for such objects semi-submersible type filters configured for being inserted at least partially in the reservoir. The semi-submersible filters consist in an elongated generally cylindrically-shaped container substantially defining the outer shell and the element engaging the filter to the reservoir. The container exhibits a fixing portion placed at the top of the filter, which enables to stably engage the same to the reservoir and to partially submerge this latter in the working fluid. The container exhibits, also at the top of the filter, an inlet configured for enabling to introduce the working fluid; opposite to the inlet, in other words at the bottom of the container, an outlet for emitting the filtered fluid is provided. The container defines inside a housing compartment adapted to house a filtering cartridge which is interposed between the working fluid inlet and outlet: the cartridge is the real filtering element adapted to enable a fluid to selectively flow. For ensuring to correctly filter the oil, the cartridge must be engaged inside the container in a stable tight condition so that the oil can flow out the container itself by only flowing through the cartridge.

For example, hydraulic filters exhibiting a container having, at the outlet, an engagement portion having a circular cross-section, belong to the state of the art; the cartridge comprises a respective engagement portion countershaped to the engagement portion of the container and therefore having also a cross-section having a circular shape: such engagement portions are configured for cooperating with each other for defining the coupling between the container and cartridge. Between said engagement portions, there is a seal which represents the effective sealing element adapted to prevent the unfiltered fluid from flowing from the outlet.

Although the cited filters enable to filter the working fluid, these latter are not clear of some disadvantages and are improvable under several aspects. It is useful to note that the circular shape of the portions coupling the container and cartridge, enables to displace the cartridge itself inside the container: the cylindrical shape does not prevent the cartridge from rotating with respect to the container. The displacement leads to an increase of the flow resistance and consequently a substantial power waste of the plant or operative machine equipped with the filter. Moreover, rotating the cartridge inside the container could determine some gaps which could enable the flow of unfiltered oil. A further disadvantage causable by continuously reciprocally displacing the cartridge and container, refers to a possible damage, for example by wear or tear, of the seal which in turn compromises the seal.

A further example of a filter for hydraulic circuits is described in the U.S. patent application U.S. 2012/0223006 A1, such application describes a filter exhibiting a container which, at the outlet, comprises an engagement portion defined by a projection having a substantially "T" cross-section (symmetrical about a plane); the cartridge comprises a respective engagement portion defined by a seat countershaped to a portion engaging the container, and therefore having also a "T" cross-section: such engagement portions are configured for cooperating with each other for defining the coupling between the container and cartridge. Between said engagement portions is present a seal which represents the effective sealing element adapted to prevent the unfiltered fluid from flowing from the outlet.

The filter described in the U.S. application is an improvement with respect to the above described filters (circular engagement portions) because it exhibits "T" coupling portions preventing the relative rotation between the container and cartridge: under such condition, it is possible to prevent an increase of the flow resistance in the circuit. Moreover, avoiding relative displacements between the cartridge and container enables to avoid to damage by wear the seal. This latter however is not devoid of some inconveniences and is improvable under several aspects. Providing a projection engagement portion on the container and a seat engagement portion on the cartridge makes quite troublesome coupling the two elements to each other; particularly, it is highly difficult to provide a seal between the two elements and assemble the filter without displacing and/or damaging the seal. Therefore, an inadequate assembly could compromise the functionality of the overall filter.

SUMMARY

A filter adapted to ensure an efficient filtering designed to prevent the passage of unfiltered oil is described. The filter exhibits elements stably engaged with each other in order to prevent wear and damage of the filtering elements. Particularly, relative displacements between the container and cartridge are prevented which could damage the filter sealing elements. Moreover, a simply manufacturable filter which is easily and correctly assembled is provided; such features further enable to define a filter for hydraulic fluids having a high quality and which is at the same time economical (having low manufacturing and assembling costs). A process of making a filter for hydraulic fluids is described which is particularly simplified and ready which prevents, during the assembly step, the filtering and hydraulic sealing elements from being damaged.

In a 1st aspect it is provided a filter (1) for hydraulic fluids for hydraulic circuits comprising:
- a container (2) exhibiting inside at least one housing compartment (3) fluidically communicating with at least one inlet (4) and at least one outlet (5) associated with said container (2),
- at least one filtering cartridge (6) engageable with the container (2) inside the housing compartment (3), the filtering cartridge (6) partitioning the housing compartment (3) in a first chamber (3a) fluidically communicating with the inlet (4) and a second chamber (3b) fluidically communicating with the outlet (5), the cartridge (6) being configured and positioned for determining the filtering of the hydraulic fluid from the inlet (4) and flowing from the first to the second chambers (3a, 3b),
- the container (2) exhibiting at least one engagement portion (7) projecting inside the housing compartment and defining at least one collar (7a) having an outer coupling lateral surface (8),
- the filtering cartridge (6) exhibiting a respective engagement portion (9) defining a respective collar (9a) exhibiting an inner coupling lateral surface (10) configured for tightly engaging outside the outer coupling surface (8) of the container (2),
- the outer coupling surface (8) of the engagement portion (7) of the container (2) exhibiting, along a cross-section, a polygonal shape, the inner coupling surface (10) of the engagement portion (9) of the cartridge (6) being at least partially countershaped to the outer coupling surface (8) of the container (2), said outer and inner coupling surfaces (8, 10) being configured for cooperating with each other to define a removable engagement between the filtering cartridge (6) and container (2).

In a 2nd aspect according to the aspect 1, the inner coupling surface (10) of the filtering cartridge (6) is completely countershaped to the outer coupling surface (8) of the container (2).

In a 3rd aspect according to any one of the preceding aspects, the inner coupling surface (10) of the engagement portion (9) of the filtering cartridge (6) exhibits, along a cross-section, a polygonal shape.

In a 4th aspect according to any one of the preceding aspects, wherein the collar (7a) of the engagement portion (7) comprises a projection emerging inside the housing compartment (3) of the container (2) and outwardly delimited by the outer coupling surface (8), the inner coupling surface (10) of the collar (9a) of the filtering cartridge (6) being configured for engaging outside the coupling surface (8) of the container (2).

In a 5th aspect according to any one of the preceding aspects, the outer coupling surface (8) of the engagement portion (7) of the container (2) exhibits, along a cross-section, a simple polygonal shape, particularly a polygonal shape exhibiting a number of sides equal to or greater than 4, still more particularly between 4 and 8.

In a 6th aspect according to any one of the preceding aspects, the inner coupling surface (10) of engagement portion (9) of the filtering cartridge (6) exhibits, along a cross-section, a simple polygonal shape, particularly a polygonal shape exhibiting a number of sides equal to or greater than 4, still more particularly between 4 and 8.

In a 7th aspect according to any one of the preceding aspects, the outer coupling surface (8) of the engagement portion (7) of the container (2) exhibits, along a cross-section, a regular polygonal shape, particularly a hexagonal shape.

In an 8th aspect according to any one of the preceding aspects, the inner coupling surface (10) of the engagement portion (9) of the filtering cartridge (6) exhibits, along a cross-section, a regular polygonal shape, particularly a hexagonal shape.

In a 9th aspect according to the preceding aspect, the projection defined by the collar (9a) of the filtering cartridge (6) is laterally delimited by an outer lateral surface and an inner lateral surface, the inner coupling surface (10) of the filtering cartridge (6) is at least partially defined by the inner lateral surface of the collar (9a) of said filtering cartridge (6).

In a 10th aspect according to any one of the preceding aspects, the collar (9a) of the filtering cartridge (6) comprises a projection exhibiting a through opening defining said inner coupling surface (10), the collar (9a) of the filtering cartridge (6) is configured for engaging outside a projection defined by the collar (7a) of the engagement portion (7) of the container (2).

In an 11th aspect according to the preceding aspect, the projection defined by the collar (9a) of the filtering cartridge (6) is laterally delimited by an outer lateral surface and an inner lateral surface, the coupling surface (10) of the filtering cartridge (6) is defined at least partially by the inner lateral surface of the collar (9a) of said filtering cartridge (6).

In a 12th aspect according to any one of the preceding aspects, the filter comprises at least one seal (11) interposed between the engagement portions (7, 9) respectively of the container (2) and filtering cartridge (6).

In a 13th aspect according to the preceding aspect, the seal (11) comprises a closed perimetral element configured for defining the fluid tightness between the filtering cartridge (6) and container (2).

In a 14th aspect according to the aspect 12 or 13, the seal (11) is stably supported by the collar (9a) of the filtering cartridge (6) and is interposed between the coupling surfaces (8, 10) respectively of the container (2) and filtering cartridge (6).

In a 15th aspect according to any one of the aspects from 12 to 14, the inner lateral surface of the collar (9a) of the filtering cartridge (6) exhibits a perimetral cavity (12) extending all around said collar (9a) for defining a closed outline, the seal (11) being stably engaged at least partially inside said perimetral cavity (12), the seal (11) being configured for contacting the outer lateral surface of the engagement portion (7) of the container (2) defining at least partially the outer coupling surface (8) of this latter.

In a 16th aspect according to any one of the aspects from 12 to 15, the seal (11) comprises a body countershaped to the inner coupling surface (10) of the filtering cartridge (6), particularly exhibiting a polygonal shape, still more particularly a hexagonal shape.

In a 17th aspect according to any one of the aspects from 12 to 16, the seal (11), according to a cross-section, exhibits a circular or elliptical outline.

In an 18th aspect according to any one of the aspects from 11 to 17, the seal (11) is made of plastic material.

In a 19th aspect according to any one of the preceding aspects, at least the collar (9a) of the filtering cartridge (6) is made of plastic material and is obtained by moulding.

In a 20th aspect according to the preceding aspect, the seal is engaged around the collar (9a) of the filtering cartridge (6).

In a 21st aspect according to any one of the aspects from 15 to 20, the perimetral cavity (12) extends between first and second longitudinal end portions of the inner lateral wall of the collar (9a).

In a 22nd aspect according to any one of the preceding aspects, the collar (9a) of the engagement portion (9) of the cartridge (6) comprises at least one first body and one second body (13, 14) engageable with each other, particularly reversibly, along an axial direction parallel to a length of the inner coupling surface (10) of the engagement portion (9) of the filtering cartridge (6) itself.

In a 23rd aspect according to the preceding aspect, the first body (13) comprising a through opening defining, on the first body itself, part of the inner coupling surface (10) of the filtering cartridge (6).

In a 24th aspect according to the aspect 22 or 23, the second body (14) comprising a respective opening defining on the second body itself, part of the inner coupling surface (10) of the filtering cartridge (6).

In a 25th aspect according to the aspect 22 or 23 or 24, the first and second bodies are configured for engaging, particularly reversibly, with each other along an axial direction parallel to a longitudinal axis of the filtering cartridge (6) for defining the coupling surface (10) of the collar (9a) of the filtering cartridge (6) itself.

In a 26th aspect according to any one of the aspects from 22 to 25, at least the first and/or second bodies (13, 14) of the collar (9a) of the filtering cartridge (6) comprises a groove configured for defining, under the reciprocal coupling condition of the first and second bodies (13, 14), the perimetral cavity (12) of the collar (9a) of the filtering cartridge (6) itself.

In a 27th aspect according to any one of the preceding aspects, the container (2) exhibits an elongated shape, particularly a cylindrical shape, extending along a longitudinal axis (D) between a first and second ends (2a, 2b), the inlet (4) of the container (2) being substantially disposed at the first end (2a), the outlet (5) can be disposed at the inlet (4), particularly disposed at the first end (2a) of the container (2), or opposite to the inlet (4), particularly disposed at the second end (2b).

In a 28th aspect according to the preceding aspect, the engagement portion (7) of the container (2) is disposed at the first and/or second ends (2b) of the container (2).

In a 29th aspect according to the aspect 27 or 28, the engagement portion (7) of the container (2) extends from a base, parallel to the longitudinal axis (D) of the container (2) itself, towards the inside of the filtering cartridge (6).

In a 30th aspect according to the preceding aspect, the outer coupling surface (8) of the collar (7a) of the container (2) exhibits a first segment extending inside the cartridge (6) parallel to the longitudinal axis (D) of the container (2), the outer coupling surface (8) of the collar (7a) of the container (2) exhibiting a second segment extending inside the filtering cartridge (6) without interruption with respect to the first segment.

In a 31st aspect according to the preceding aspect, the outer coupling surface (8) of the second segment being sloped with respect to the longitudinal axis (D) of the container (2) and converging according to a direction entering the filtering cartridge (6).

In a 32nd aspect according to the preceding aspect, the outer coupling surface (8) of the collar (7a) of the container (2) is sloped with respect to the longitudinal axis (D) of the container (2) with an angle between 1° and 5°, particularly between 1° and 3°.

In a 33rd aspect according to any one of the preceding aspects, the container (2) comprises at least one tubular shape main body (17), particularly exhibiting the outlet (5), the container (2) further comprising at least one head (8) exhibiting the inlet (4) and removably engaged with the main body (17).

In a 34th aspect according to the preceding aspect, the filtering element (6) exhibits a tubular shape and is inserted inside the main body (17), particularly the filtering element (6) being substantially countershaped to the main body (17).

In a 35th aspect according to any one of the preceding aspects, the container (2) and filtering cartridge (6) extend along a same longitudinal axis.

In a 36th aspect according to any one of the aspects from 33 to 35, the portion of the main body (17) wherein the filtering cartridge (6) is housed, exhibits a substantially circular cross-section, and wherein the filtering cartridge (6) comprises a substantially circular cross-section.

In a 37th aspect according to any one of the aspects from 33 to 36, at least the main body (17) of the container (2) and the filtering cartridge (6) have respective cylindrical symmetries around a same axis.

In a 38th aspect according to the preceding aspect, the outer coupling surface (8) of the container (2) exhibits a cylindrical symmetry around the cylindrical symmetry axis of the filtering cartridge (6).

In a 39th aspect according to the aspect 37 or 38, the inner coupling surface (10) of the filtering cartridge (6) exhibits a cylindrical symmetry around the cylindrical symmetry axis of the main body (17) of the container (2).

In a 40th aspect according to any one of the preceding aspects, wherein the filtering cartridge (6) and container (2) are aligned along a same symmetry axis.

In a 41st aspect according to any one of the preceding aspect, the filtering cartridge (6) comprises:
- at least one tubular supporting element (19) extending between a first and second ends (19a, 19b) and exhibiting a lateral wall supporting a plurality of through holes,
- at least one filtering membrane (20) engaged around the lateral wall of the supporting element (19) and configured for enabling a fluid selective passage through the membrane itself,
- at least one first and one second retaining elements (21, 22) respectively engaged at the first and second ends of the supporting element (19).

In a 42nd aspect according to the preceding aspect, the first and/or second retaining elements (21, 22) of the filtering cartridge (6) comprises the respective engagement portion (9) supporting the respective collar (9a).

In a 43rd aspect according to the aspect 41 or 42, the first retaining element (21) is made at least partially of plastic material and/or metal material, particularly the first retaining element (21) is made at least partially of at least one comprised in the group of the following materials: aluminum nylon, steel, cast iron.

In a 44th aspect according to the aspect 41 or 42 or 43, the second retaining element (22) is at least partially made of plastic and/or metal material, particularly, the second retaining element (22) is at least partially made of at least one comprised in the group of the following materials: aluminum, nylon, steel, cast iron.

In a 45th aspect according to any one of the preceding aspects, the container (2) is made of plastic and/or metal material, particularly the container (2) being made at least partially of one comprised in the group of the following materials: aluminum, nylon, steel, cast iron.

In a 46th aspect according to any one of the preceding aspects, the collar (9a) of the filtering cartridge (6) is made at least partially, particularly completely, of plastic and/or metal material, optionally the collar (9a) of the filtering cartridge (6) being made at least of one comprised in the group of the following materials: nylon, aluminum, steel.

In a 47th aspect according to any one of the aspects from 12 to 46, the seal (11) is made at least partially, particularly completely, of a plastic material, particularly, of an elastomeric material, for example is made at least partially of nylon.

In a 48th aspect according to any one of the preceding aspects, the first chamber (3a) of the container (2) directly communicates with the inlet (4).

In a 49th aspect according to any one of the preceding aspects, the second chamber (3b) of the container (2) directly communicates with the outlet (5).

In a 50th aspect according to any one of the preceding aspects, the outer coupling surface (8) of the container (2) extends along a longitudinal axis, the polygonal transverse section is made along a plane transverse, particularly normal, to the longitudinal axis of said outer coupling surface (8).

In a 51st aspect according to any one of the preceding aspects, the inner coupling surface (10) of the filtering cartridge (6) extends along a longitudinal axis, the polygonal cross-section is made along a plane transverse, particularly normal, to the longitudinal axis of said inner coupling surface (10).

In a 52nd aspect a process of making a filter (1) for hydraulic fluids for hydraulic circuits according to any one of the preceding aspects is provided.

In a 53rd aspect according to the preceding aspect, the process comprises at least the following steps:
  providing the container (2) which exhibits at least one engagement portion (7) projecting inside the housing compartment and defining at least one collar (7a) having an outer coupling later surface (8),
  providing the filtering cartridge (6) which exhibits a respective engagement portion (9) defining a respective collar (9a) exhibiting an inner lateral coupling surface (10) configured for tightly engaging outside the outer coupling surface (8) of the container (2),
  and wherein the step of providing the container provides forming an engagement portion (7) exhibiting an outer coupling surface (8) having a polygonal cross-section, and wherein the step of providing the filtering cartridge (6) provides forming a respective engagement portion (9) exhibiting an inner coupling surface (10) at least partially countershaped to the outer coupling surface (8) of the container (2).

In a 54th aspect according to the preceding aspect, the process comprises at least one step of engaging the container (2) and filtering cartridge (6) adapted to engage the outer and inner coupling surfaces (8, 10) of the container (2) and filtering cartridge (6).

In a 55th aspect according to the aspect 53 or 54, the outer coupling surface (8) of the container (2) exhibits, along a cross-section, a simple polygonal shape, particularly a regular polygonal shape, still more particularly a hexagonal shape.

In a 56th aspect according to any one of the preceding aspects of process, the inner coupling surface (10) of the filtering cartridge (6) is countershaped to the outer coupling surface of the container (2).

In a 57th aspect according to any one of the preceding aspects of process, the inner coupling surface (10) of the engagement portion (9) of the filtering cartridge (6) exhibits, along a cross-section, a simple polygonal shape, particularly a regular polygonal shape, still more particularly a hexagonal shape.

In a 58th aspect according to any one of the preceding aspects of process, the step of providing the engagement portion (7) of the container (2) provides forming the respective collar (7a) defined by the tubular projections, and wherein the step of providing the respective engagement portion (9) of the filtering cartridge (6) provides forming the respective collar (9a) defined by a projection configured for engaging outside the projection defined by the collar (7a) of the container (2).

In a 59th aspect according to the preceding aspect, the projection defined by the collar (9a) of the filtering cartridge (6) is laterally delimited by an outer lateral surface and an inner lateral surface, the inner coupling surface (10) of the filtering cartridge (6) is defined by at least part of the inner lateral surface of the collar (9a) of said filtering cartridge (6).

In a 60th aspect according to the aspect 58 or 59, the projection defined by the collar (7a) of the container (2) is laterally delimited by an outer lateral surface and an inner lateral surface, the outer coupling surface (8) of the container (2) is defined by at least part of the outer lateral surface of the collar (7) of said container (2).

In a 61st aspect according to any one of the preceding aspects of process, wherein said process further comprises at least the following steps:
  forming at least one seal (11),
  engaging said seal (11) between the engagement portions (7, 9) respectively of the container (2) and cartridge (6), the seal (11) comprising a closed perimetral element configured for defining the fluid tightness between the filtering cartridge (6) and container (2).

In a 62nd aspect according to the preceding aspect, the seal (11) is stably supported by the collar (9a) of the filtering cartridge (6) and is interposed between the outer and inner coupling surfaces (8, 10) respectively of the container (2) and filtering cartridge (6).

In a 63rd aspect according to the aspect 61 or 62, the inner lateral surface of the collar (9a) of the filtering cartridge (6) exhibits a perimetral cavity (12) extending all around said collar (9a) for defining a closed outline, the seal (11) being stably engaged at least partially inside said perimetral cavity (12), the seal (11) being configured for contacting at least part of the coupling surface (8) of this latter.

In a 64th aspect according to any one of the aspects from 61 to 63, the seal (11) comprises a body countershaped to the inner coupling surface (10) of the filtering cartridge (6), particularly exhibiting a polygonal shape, optionally a hexagonal shape.

In a 65th aspect according to any one of the aspects from 61 to 64, the seal (11), according to a cross-section, exhibits a circular or elliptical outline.

In a 66th aspect according to any one of the aspects from 61 to 65, the step of providing the filtering cartridge (6) comprises at least the following steps:

forming the first body (13) of the collar (9a) of the engagement portion (9) exhibiting a through opening, forming the second body (14) of the collar (9a) of the engagement portion (9) exhibiting a respective through opening, defining on the first and/or on the second bodies, a perimetral groove configured for receiving at least part of the seal (11), providing the seal (11) inside the groove of the first and/or of the second bodies (13, 14), engaging the first and second bodies (13, 14) so that the respective openings are aligned to define the inner coupling surface (10) of the collar (9a) of the filtering cartridge (6), following the engagement between the first and second bodies, the seal (11) being interposed between these latter.

In a 67th aspect according to any one of the aspects from 61 to 66, the seal (11) is made at least partially of a plastic material, particularly the seal (11) being made at least partially of an elastomeric material, optionally of nylon.

In a 68th aspect according to any one of the aspects from 53 to 67, the container (2) exhibits an elongated shape, particularly a cylindrical one, extending along a longitudinal axis (D) between a first and second ends (2a, 2b), the inlet (4) of the container (2) being disposed substantially at the first end (2a) while the outlet (5) is disposed at the inlet (4), particularly disposed at the first end (2a), or is disposed opposite to the inlet, particularly is disposed at the second end (2b).

In a 69th aspect according to the preceding aspect, the engagement portion (7) of the container (2) is disposed at the first and/or second ends (2b) of the container (2).

In a 70th aspect according to any one of the aspects from 53 to 69, the step of providing the container (2) comprises the following sub-steps:

forming a tubular shape main body (17), particularly having at least one outlet (5), forming at least one head (18) having the inlet (4), removably engageable with the main body (17) opposite to the outlet (5), the process provides to engage the head with the main body following the insertion in the filtering cartridge (6) of this latter.

In a 71st aspect according to the preceding aspect, the process comprises at least the following steps:

separately providing the main body (17) and head (18) of the container (2), following the step of separately providing the main body (17) and head (18), inserting and engaging the filtering cartridge (6) inside the main body (17), engaging the head (18) with the main body (17) in order to close the container (2) and stably hold the filtering cartridge (6) inside said container (2).

In a 72nd aspect according to any one of the aspects from 53 to 71, the step of providing the filtering cartridge (6) comprises at least the following sub-steps:

forming at least one tubular supporting element (19) extending between first and second ends (19a, 19b) and exhibiting a lateral wall having a plurality of through holes, forming at least one filtering membrane (20) engaged around the lateral wall of the supporting element (19) and configured for enabling a selective passage of a fluid through the membrane itself, forming at least one first and one second retaining elements (21, 22) respectively engaged at the first and second ends of the supporting element (19), said retaining elements (21, 22) being configured for stably retaining the filtering membrane (20) around the supporting element (19).

In a 73rd aspect according to the preceding aspect, the first and/or second retaining elements (21, 22) of the filtering cartridge (6) comprise the respective engagement portion (9) supporting the respective collar (9a).

In a 74th aspect according to the aspect 72 or 73, the first retaining element (21) is made at least partially of a plastic and/or metal material, particularly the first retaining element (21) is made at least partially of at least one selected in the group of the following materials: aluminum, nylon, steel.

In a 75th aspect according to the aspect 72 or 73 or 74, the second retaining element (22) is made at least partially of a plastic and/or metal material, particularly the second retaining element (22) is made at least partially of at least one selected in the group of the following materials: aluminum, nylon, steel.

In a 76th aspect according to any one of the aspects from 53 to 75, the container (2) is made of a plastic and/or metal material, particularly the container (2) being made of at least one comprised in the group of the following materials: aluminum, nylon, steel, cast iron.

In a 77th aspect according to any one of the aspects from 53 to 76, the collar (9a) of the filtering cartridge (6) is made at least partially, particularly completely, of a plastic and/or metal material, optionally the collar (9a) of the filtering cartridge (6) being made of at least one selected in the group of the following materials: nylon, aluminum, steel.

In a 78th aspect, it is provided a filtering cartridge (6), particularly for hydraulic filters for hydraulic circuits, said filtering cartridge (6) comprising:

at least one tubular supporting element (19) extending along a length between first and second ends (19a, 19b) and exhibiting a lateral wall having a plurality of through holes, at least one filtering membrane (20) engaged around the lateral wall of the supporting element (19) and configured for enabling a selective passage of a fluid through the membrane itself, at least one first and one second retaining elements (21, 22) respectively engaged at the first and second ends (19a, 19b) of the supporting element (19), and wherein at least one between the first and second retaining elements (21, 22) of the filtering cartridge (6) comprises an engagement portion (9) defining a collar (9a) substantially extending parallel to the longitudinal axis of the supporting element (19), said collar (9a) exhibiting a coupling lateral surface (10) configured for tightly engaging inside or outside a coupling surface (8) of a container (2) of a filter (1) for hydraulic fluids, the coupling surface (10) of the engagement portion (9) of the filtering cartridge (6) exhibiting, along a section transverse to the longitudinal axis of the collar (9a) of the engagement portion itself, a polygonal shape.

In a 79th aspect according to the preceding aspect, the coupling surface (10) of the coupling portion (9) of the filtering cartridge (6) exhibits, along a section transverse to the longitudinal axis of the collar (9a) of the engagement portion itself, a simple polygonal shape, particularly a polygonal shape exhibiting a number of sides equal to or greater than 4, still more particularly between 4 and 8.

In an 80th aspect according to the aspect 78 or 79, the coupling surface (10) of the engagement portion (9) of the filtering cartridge (6) exhibits, along a section transverse to the longitudinal axis of the collar (9a) of the engagement portion itself, a regular polygonal shape, particularly a hexagonal one.

In an 81st aspect, it is provided a use of the filtering cartridge (6) according to any one of the aspects from 78 to 80 as a filtering element of a filter for hydraulic fluids for hydraulic circuits, particularly for filters of the submersible, semi-submersible or pressurized types.

BRIEF DESCRIPTION OF THE DRAWINGS

Some embodiments and some aspects will be described in the following with reference to the attached drawings, given only in an illustrative and therefore nonlimiting way, wherein:

FIG. 16 is a perspective view of an embodiment variant of a filter;

FIG. 17 is a cross-sectional view of the filter in FIG. 16;

FIG. 24 is a perspective view of an embodiment variant of a filter;

FIG. 25 is a cross-sectional view of the filter in FIG. 24.

DETAILED DESCRIPTION

Filter for Hydraulic Fluids for Hydraulic Circuits

A filter for hydraulic fluids for hydraulic circuits has been generally indicated by 1. The filter 1 can find an advantageous application, generally, in all hydraulic circuits, inside which it is required to supply a clean oil, in other words devoid of solid, liquid and gas type contaminant substances. For example, the filter 1 can be used in industrial plants, construction machines, agricultural machines, hoisting and transporting vehicles. Particularly, the filter 1 can find application in lubrication or filtering systems of the submersible, semi-submersible or pressurized type.

Figure 1:
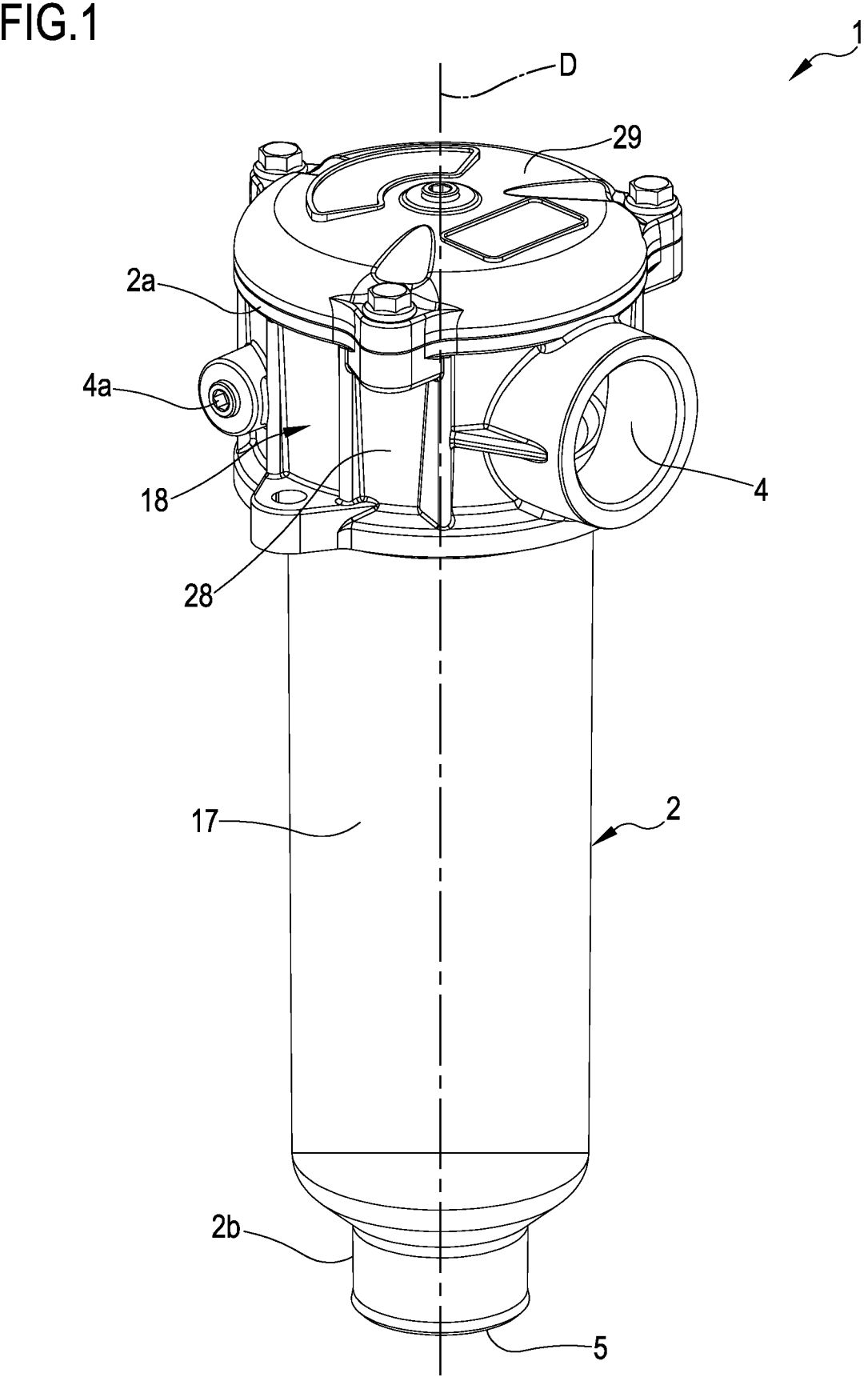
FIG. 1 is a perspective view of a filter.
Figure 20:
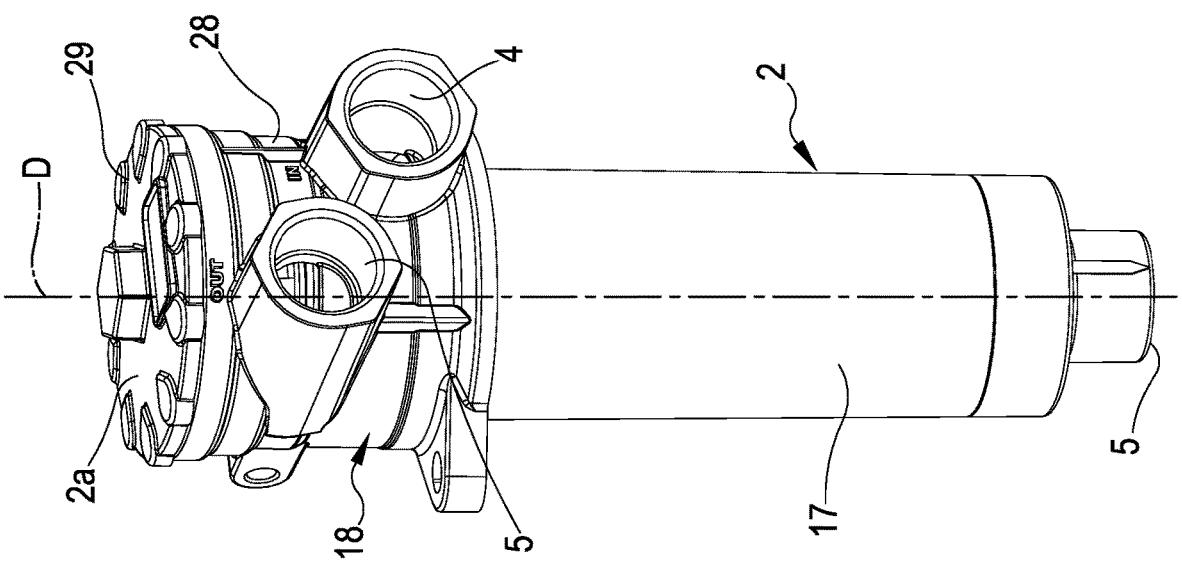
FIG. 20 is a perspective view of an embodiment variant of a filter.

As it is visible in FIGS. 1-4, 16, 20, 24, for example, the filter 1 comprises a container 2 defining inside at least one housing compartment 3 fluidically communicating with at least one inlet 4 and at least one outlet 5 associated with said container 2. More particularly, the container 2 exhibits a tubular shape extending between a first and second ends 2a, 2b. The attached figures illustrate a container 2 exhibiting, in a nonlimiting way, a substantially cylindrical shape; however, it is possible to provide a container 2 having for example a prismatic shape. Advantageously, the container 2 has an elongated shape, in other words extending along a longitudinal axis D: the container 2 extends between the first and second ends 2a, 2b along the direction D. The inlet 4 and outlet 5 of the container 2 can be disposed in proximity with each other (see FIG. 16, for example) or can be disposed opposite to each other as illustrated in FIGS. 1, 20 and 24 for example. Specifically, in the embodiment in FIG. 16, the inlet 4 and outlet 5 are both disposed at the first end 2a of the filter 1. Vice versa, in FIGS. 1, 20 and 24, the inlet 4 is disposed at the first end 2a while the outlet 5 is opposite to the inlet 4 and particularly is disposed at the second end 2b. In this latter configuration, the first end 2a is substantially the top of the filter 1 on which the inlet 4 is located: moreover, the inlet 4 can be disposed on a lateral wall of the container (facing laterally as illustrated in the attached figures) or can be disposed on the top.

The attached figures illustrate a preferred but nonlimiting embodiment of the filter 1, which exhibits only one inlet 4 located at the first end 2a of the container 2. However, it is possible to provide a container 2 exhibiting a plurality of inlets 4 (this condition is not illustrated in the attached figures) or only one main inlet 4 and one or more auxiliary inlets 4a (Figures from 1 to 4). Opposite to the inlet 4 (FIGS. 1, 20 and 24) or at the inlet (FIG. 16), the container 2 exhibits at least one outlet 5 configured for enabling to emit the filtered hydraulic fluid.

As it is visible in FIG. 2, for example, the container 2 is configured for engaging inside (inside the housing compartment 3) at least one filtering cartridge 6 configured and positioned for determining the filtering of the hydraulic fluid from the inlet 4; the filtering cartridge 6 will be better described in the following. Therefore, for being able to better insert and then engage the cartridge 6 inside the compartment 3, the container 2 comprises at least one main body 17 and head 18 removably engageable with the body 17. The main body 17 exhibits a tubular shape and substantially defines the compartment adapted to receive and house the cartridge 6. In the embodiments illustrated in the attached figures, the inlet 4 of the filter 1 is defined, in a nonlimiting way, on the head 18; the outlet 5 instead can be defined on the main body 17 (see FIGS. 1, 20 and 24 for example) or on the same head 18 (see FIG. 16, for example). The head 18 is configured for substantially defining a closure element (lid) of the main body 17 (the attached figures illustrate, in a nonlimiting way, a configuration of the head 18 having an inlet 4 and a plurality of auxiliary inlets 4a—see FIG. 4, for example).

The possibility of providing two elements removably engageable with each other (the main body 17 and head 18) enables to insert and then engage the cartridge 6 inside the main body 17 when the head 18 is separated from this latter; upon engaging the cartridge 6, it is possible to close the container 2 by engaging the head 18 with the body 17.

Figure 2:
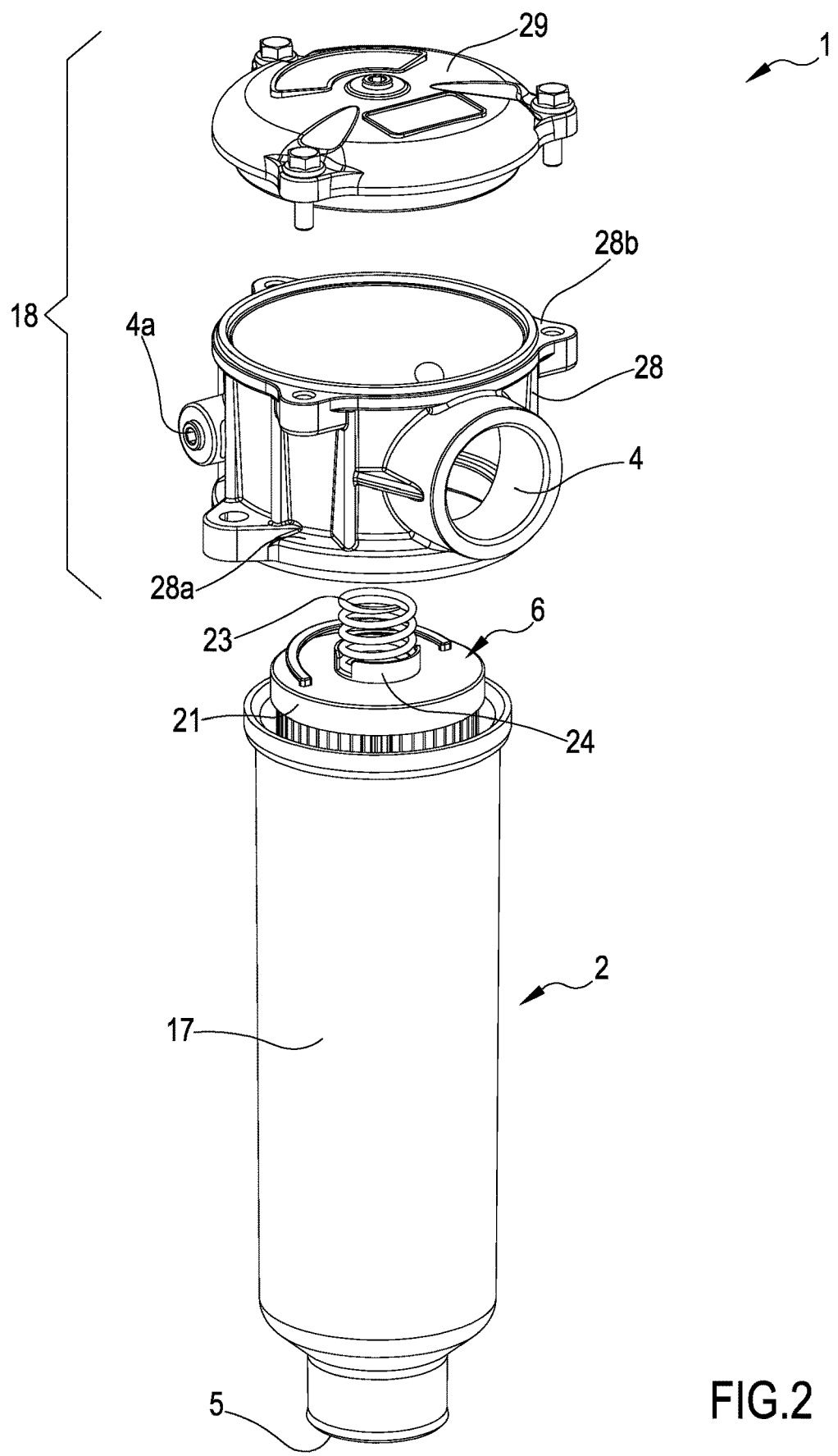
FIG. 2 is a partially exploded perspective view of the filter of FIG. 1.
Figure 4:
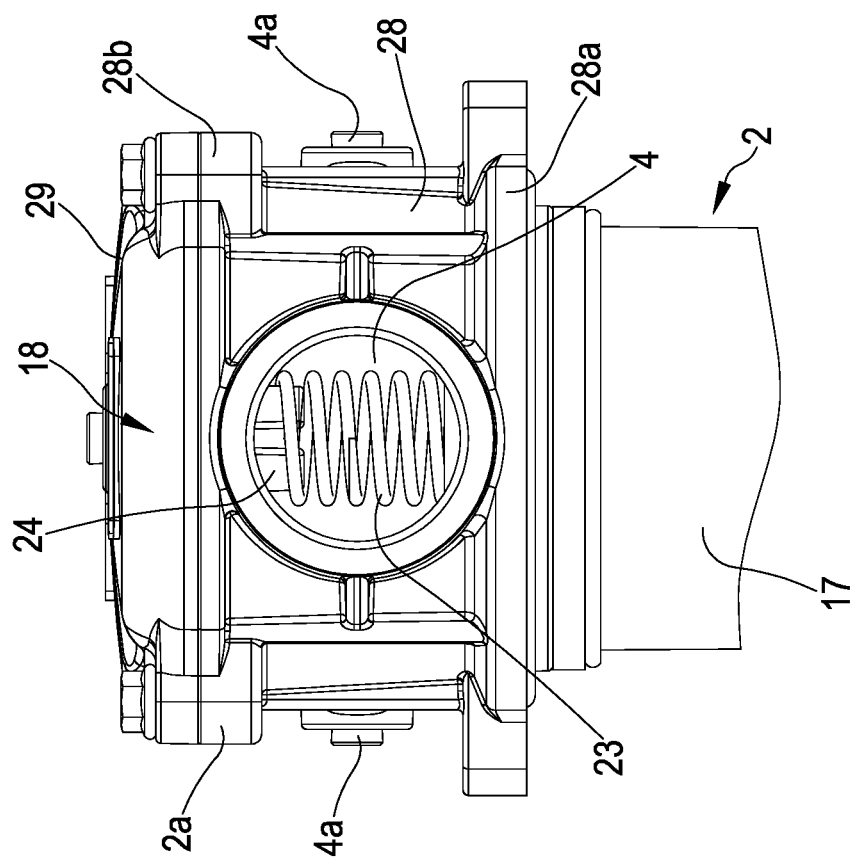
FIG. 4 is a side view of a portion of a filter.
Figure 3:
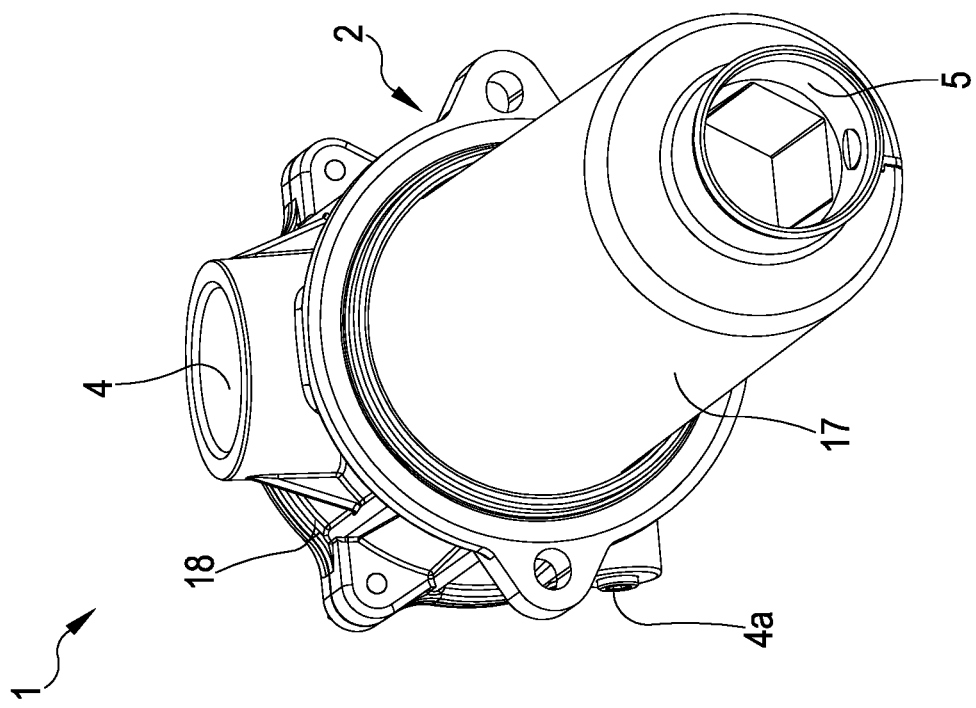
FIG. 3 is a bottom perspective view of a filter.
Figure 6:
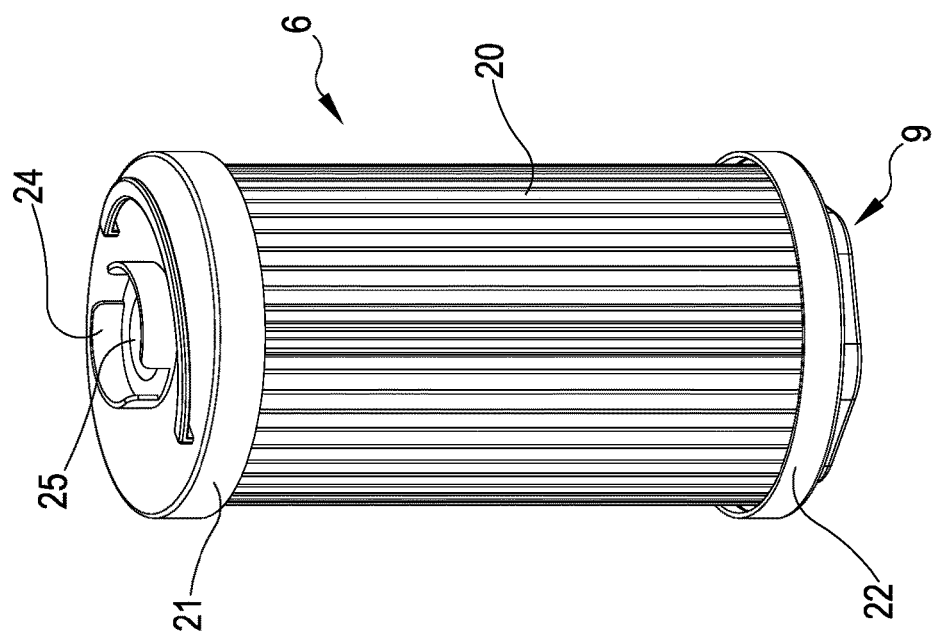
FIG. 6 is a perspective view of a filtering cartridge.

In the embodiments illustrated in FIGS. 1, 20, 24 for example, the head 18 comprises a lower body 28 having a substantially cylindrical tubular shape: the lower body 28 extends between a first and second ends 28a, 28b at which there are defined respective free edges having a circular shape defining openings of the lower body 28 (see FIG. 2, for example). In the arrangements illustrated in the attached Figures, the lower body 28 of the head 18, carries at the cylindrical lateral wall, a kind of manifold emerging outside the lateral wall of the body 28 and defining the inlet 4 of the filter configured for enabling to introduce fluids inside this latter. As it is visible, the head 18 further comprises an upper body or lid 29 tightly engaged with the lower body 28: the lower body 28 is interposed between the upper body 29 of the head 18 and the main body 17 of the container 2.

Figure 22:
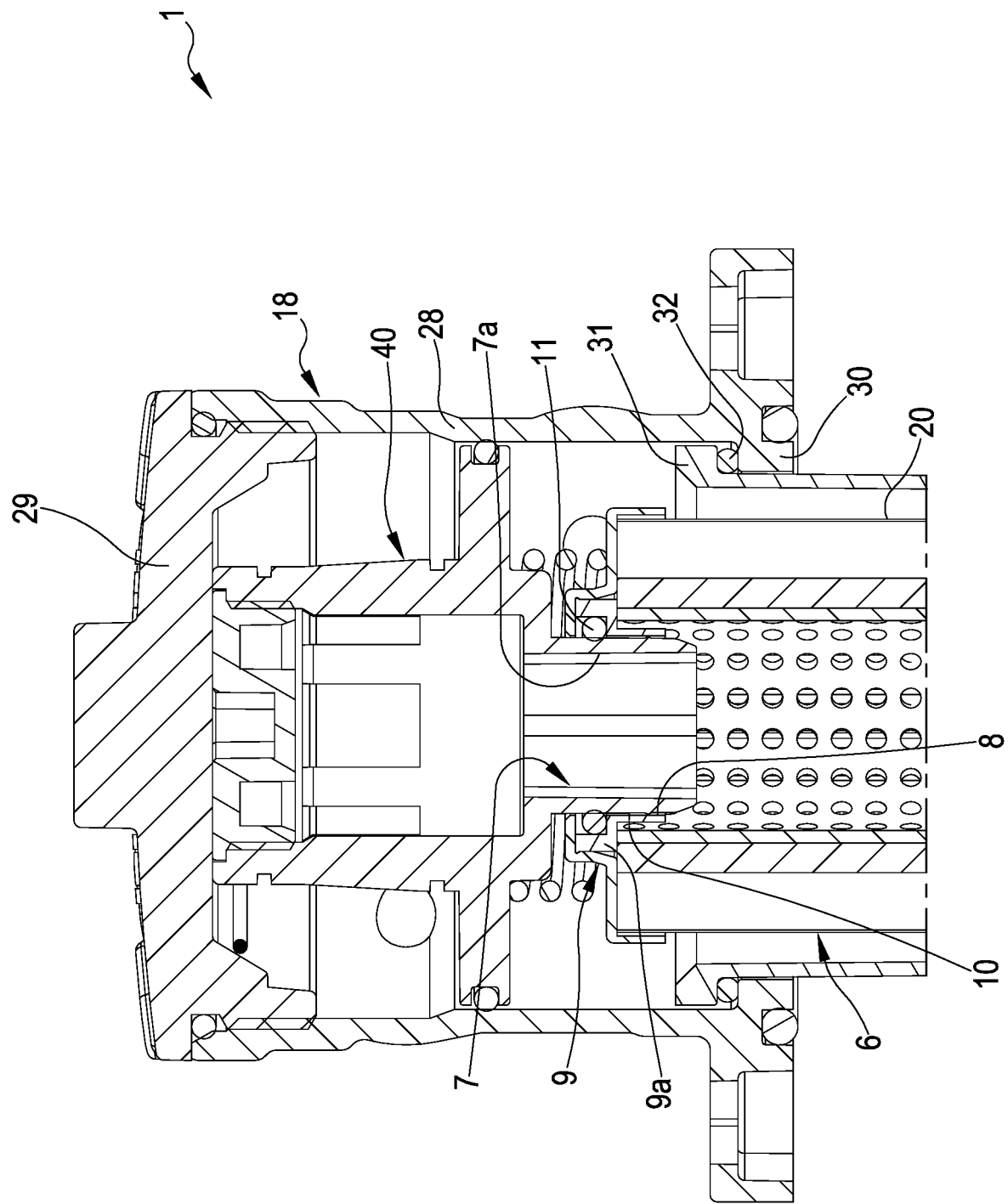
FIG. 22 is a detailed view of the cross-sectional view in FIG. 21.

More particularly and as it is visible in FIGS. 22 and 25 for example, the lower body 28 of the head 18 comprises an abutment portion 30 defined by a circular crown emerging inside the body 18 itself from the lateral wall; the abutment portion 30 of the head 18 is configured for abutting against a respective abutment portion 31 of the main body 17 located at a longitudinal end emerging outside the lateral wall of the same. A seal 32 is interposed between said abutment portions 30, 31. Upon inserting the main body 17 into the head 18 (the abutment portions 30, 31 are abutted), the upper body 29 is engaged with the lower body 28 which is configured for axially coupling the head 18 and main body 17.

Advantageously, the filter 1 further comprises at least one thrusting element 23—for example a spring—engaged inside the compartment 3 and configured for contacting, on one side, the head 18 of the container 2 and, on the other side, the filtering cartridge 6.

Particularly, the pushing element 23 is interposed between the upper body 29 of the head 18 and the filtering cartridge 6. The thrusting element 23 is configured for exerting, during the closed condition of the container 2, a force acting on the cartridge 6 for maintaining this latter stably engaged inside the main body 17. The thrusting element 23 can advantageously comprise a spring adapted to work, under compression, between the head 18 and cartridge 6. Advantageously, the head 18 and cartridge 6 comprise respective centering portions 24 adapted to grip the spring and guide it during the closing step of the container 2 and during the thrusting step.

In the just described embodiment of the head (engagement between the head and main body by the abutment portions 30 and 31), the upper body 29 can reversibly engage the body 28 to the head by means of screws (see FIG. 2, for example) or the upper body 29 can be screwed on the body 28 of the head (see FIGS. 22 and 25 for example). In a further embodiment illustrated in Figures from 16 to 19, the lower body 28 comprises, at the first end 28a, a threaded portion 33, particularly an inner thread of the head 18, configured for cooperating with the threaded portions 33a, particularly an outer thread, of the main body 17 of the container 2: the threads ensure the reversible engagement between the main body 17 and head 18 for consequently retaining the cartridge 6 as it will be better described in the following.

More particularly, it is possible to observe that the container 2 further comprises at least one engagement portion 7 projecting inside the housing compartment 3, particularly along a longitudinal axis parallel to the longitudinal axis of the main body 17: the engagement portion 7 is configured for engagingly receiving the filtering cartridge 6.

In the embodiment illustrated in Figures from 1 to 15 and 25, the engagement portion 7 of the container 2 is located at the second end 2b of the container 2 and particularly at the outlet 5: under such arrangement, the engagement portion 7 exhibits an open passage which directly fluidically communicates with the outlet 5. Advantageously, the engagement portion 7 is stably supported, particularly is formed in one piece (in a single body) with the main body 17.

Figure 19:
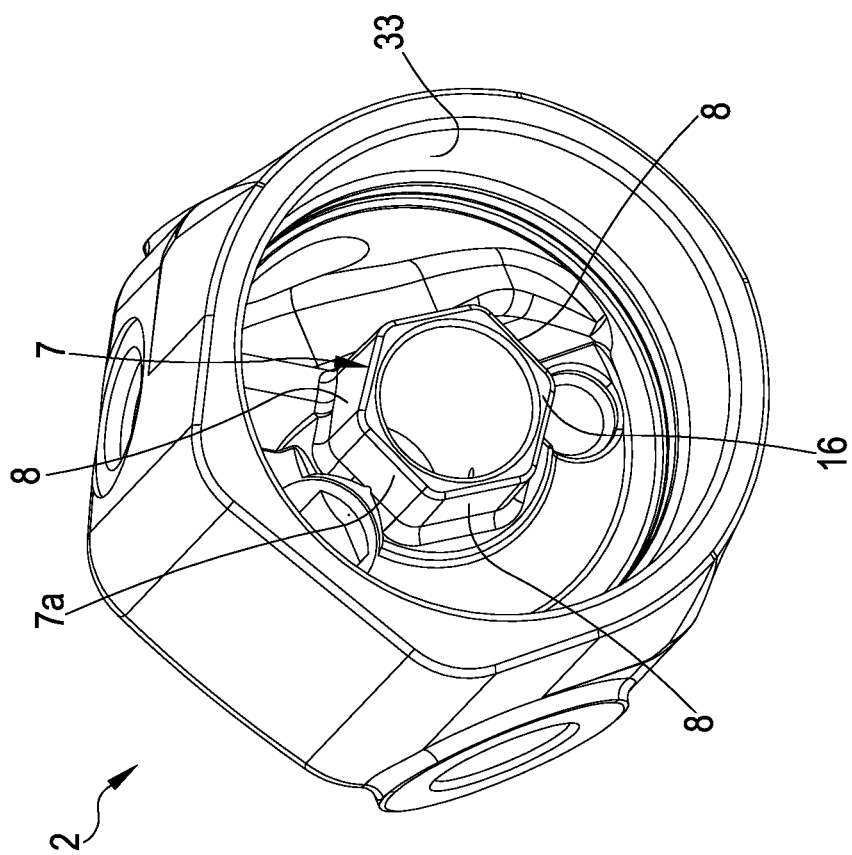
FIG. 19 is a detailed perspective view of a particular of the filter in FIG. 16.
Figure 18:
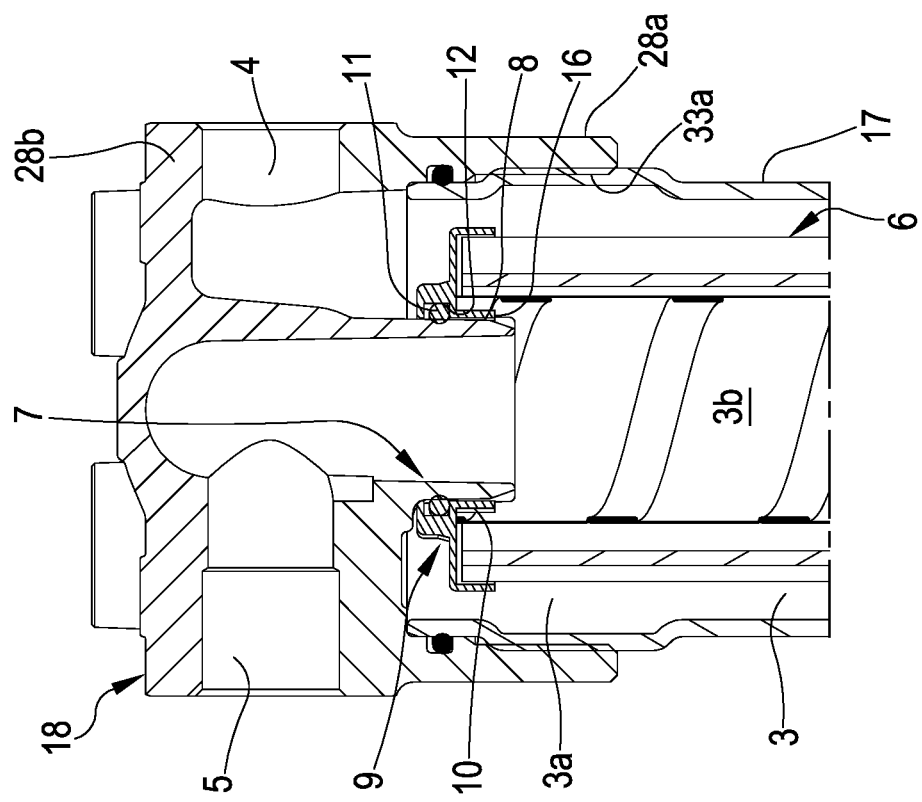
FIG. 18 is a detailed view of the cross-sectional view in FIG. 17.

In a further embodiment variant, the engagement portion 7 of the container 2 is defined at the first end 2a and particularly at the inlet 4 of the container 2 (see FIGS. 18 and 22). More particularly, in this last described configuration, the engagement portion 7 is defined on the head 18 of the container 2 and emerges for approaching the main body 7. In this last described configuration, the engagement portion 7 can exhibit a through opening fluidically directly communicating with the outlet or can define a blind body devoid of apertures as for example illustrated in FIG. 19.

The engagement portion 7 of the container 2 defines at least one collar 7a having an outer lateral coupling surface 8 (see FIGS. 8, 15, 18, 22 and 25, for example). The collar 7a extends also along the longitudinal axis D of the container 2: the outer coupling surface 8 is, for at least one segment of the length of the same, substantially parallel to the axis D. Particularly, the collar 7a extends from a base or bottom portion 34 of the container 2 towards the filtering cartridge 6 to a free edge 16 (see FIG. 9, for example). The collar 7a exhibits an length, defined by the minimum distance, measured between the base portion 34 to the free edge 16, equal to or greater than mm, particularly between 5 and 100 mm, still more particularly between 7 and 25 mm, optionally about 12 mm. The outer coupling surface 18 defines at least partially said collar 7a and exhibits a length equal to or greater than 5 mm, particularly between 5 and 100 mm, still more particularly between 7 and 25 mm, optionally about 12 mm.

Figure 9:
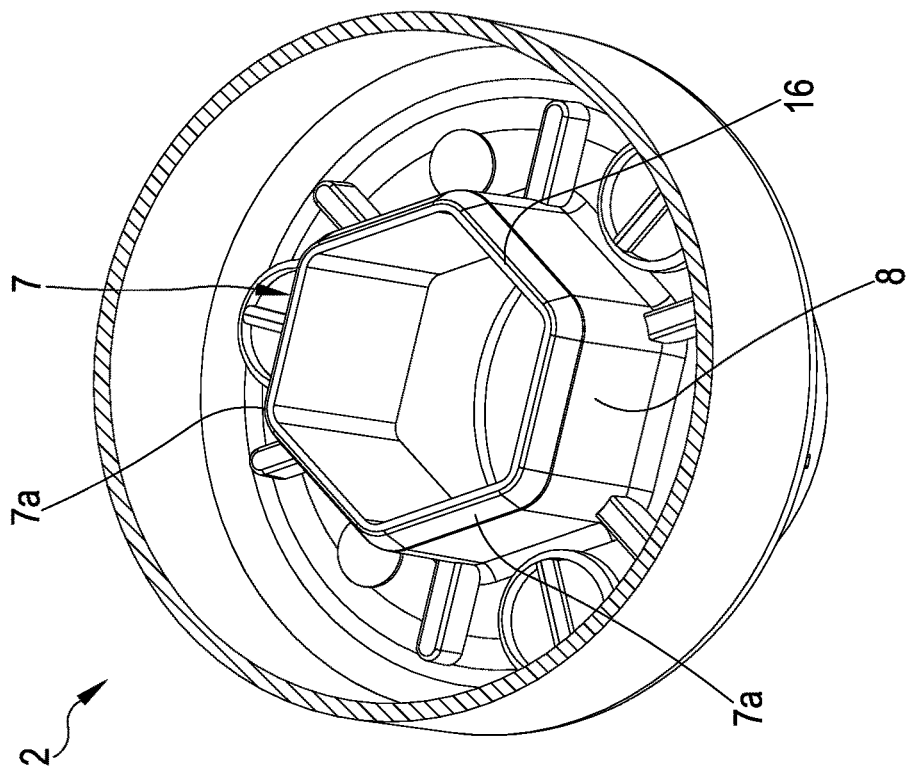
FIG. 9 is a detailed view of a portion of a container.
Figure 12:
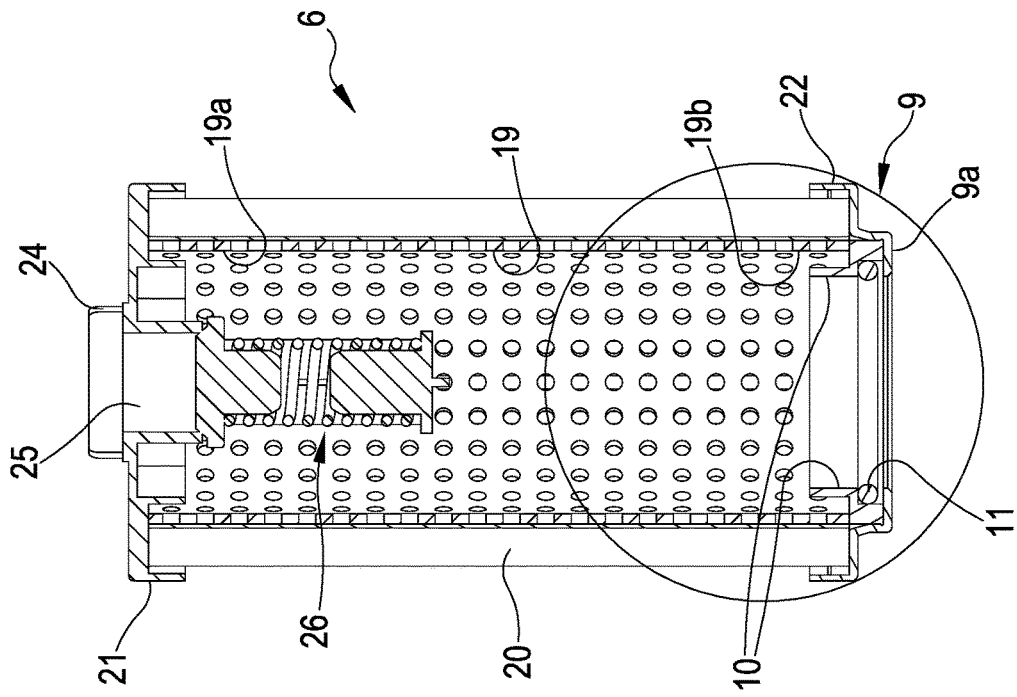
FIG. 12 is a cross-sectional view, along the line XII-XII, of the filtering cartridge in FIG. 11.
Figure 11:
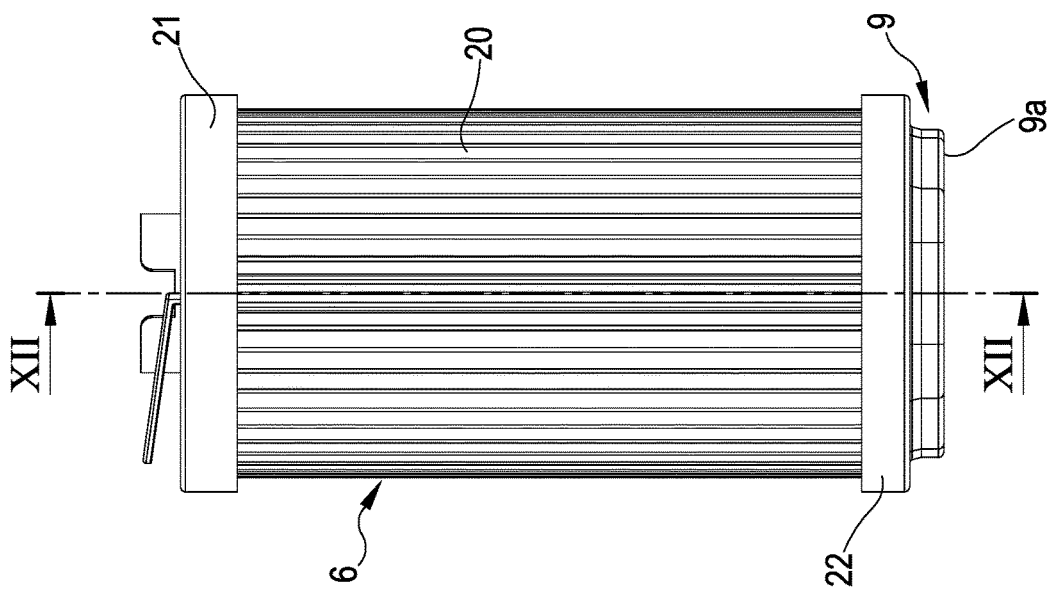
FIG. 11 is a front view of a filtering cartridge.

As it is visible in FIG. 9, the outer coupling surface 8 of the collar 7a exhibits, along a section normal to the longitudinal axis of the collar 7a itself, a polygonal type shape. More specifically, the outer coupling surface 8 exhibits a cross-section defining a closed outline having a simple polygonal shape, and particularly a regular shape. In a preferred but nonlimiting embodiment, the coupling surface 8 exhibits, along a section normal to the longitudinal axis of the collar 7a itself, a hexagonal shape. The cross-section extends along a plane transverse, particularly normal, to the length of the outer surface 8 itself, optionally normal to the longitudinal axis D of the container 2. Advantageously, the collar 7a of the engagement portion comprises a projection configured for receiving an engagement portion 9 of the filtering cartridge 6 as it will be better described in the following.

In the embodiments of the filter 1 outlined in FIGS. 2, 17 and 25 for example, the container 2 comprises only one engagement portion 7. In such configuration and as it will be better described in the following, the filtering cartridge 6 is engaged between the portions 7 of the container 2 and the thrusting element 23 (see FIG. 25 for example). Alternatively, as illustrated in FIG. 17, in the presence of the single engagement portion 7, the cartridge 6 can be engaged between the engagement portion 7 and the bottom of the main body 17 of the container 2.

However, in a further embodiment variant, the container 2 can comprise a further engagement portion 35 (FIG. 21) projecting inside the housing compartment 3 opposite the engagement portion 7 and which is configured for engagingly receiving the filtering cartridge 6.

The further engagement portion 35 of the container 2 is located at the second end 2b of the container 2 and particularly at the outlet 5: in such configuration, the further engagement portion 35 exhibits an open passage directly fluidically communicating with the outlet 5.

Figure 21:
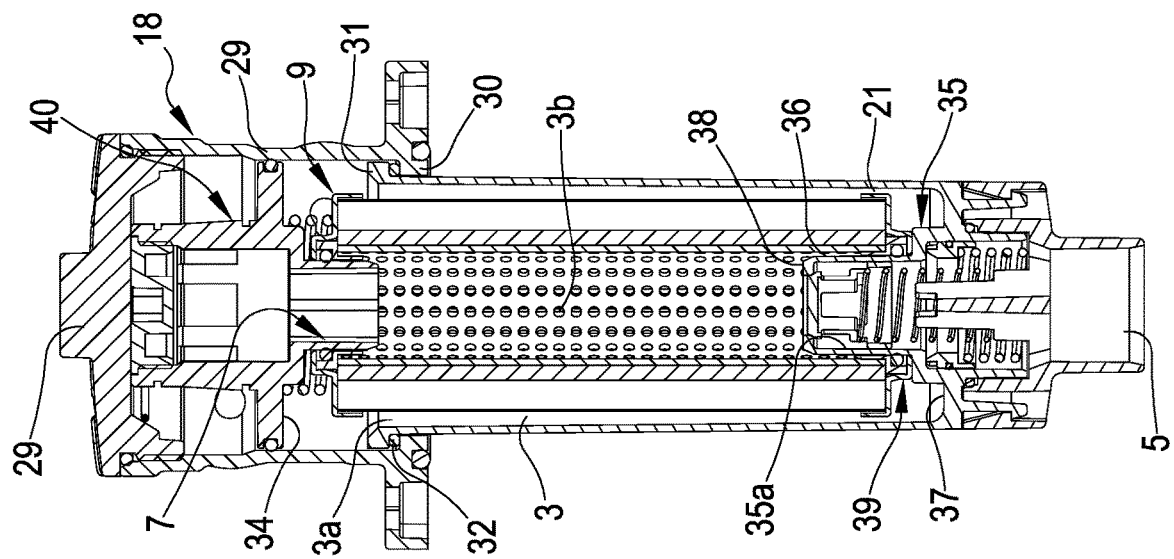
FIG. 21 is a cross-sectional view of the filter in FIG. 20.

The further engagement portion 35 of the container 2 defines also a collar 35a having an outer coupling lateral surface 36 (see FIG. 21, for example). The collar 35a extends also along the longitudinal axis D of the container 2: the outer coupling surface 36 is, for at least a segment of the length thereof, substantially parallel to the direction D and particularly parallel to the outer coupling surface 8 of the engagement portion 7. Particularly, the collar 35a extends from a base or bottom portion 37 of the container 2 towards the filtering cartridge 6 to a free edge 38 (see FIG. 21, for example). The collar 35a exhibits a length defined by the minimum distance measured between the base portion 37 to the free edge 38, equal to or greater than mm, particularly between 5 and 100 mm, still more particularly between 7 and 25 mm, optionally about 12 mm. The outer coupling surface 36 defines at least part of said collar 35a and exhibits a length equal to or greater than 5 mm, particularly between 5 and 100, still more particularly between 7 and 25 mm, optionally about 12 mm.

The outer coupling surface 36 of the collar 35a can provide, according to a section normal to the longitudinal axis of the collar itself, a shape having at least two symmetry axes. Particularly, the outer coupling surface 36 can exhibit a polygonal shape (for example a hexagonal one substantially identical in shape and/or size to the shape of the engagement portion 7), a cylindrical or elliptical shape.

As for the engagement portion 7, also the collar 35a can comprise a projection configured for receiving outside an engagement portion of the filtering cartridge 6 as it will be better described in the following. In such configuration, the filtering cartridge 6 is engaged between the engagement portion 7 and the further engagement portion 35.

From the point of view of the materials, the container 2 can be made at least partially of a plastic or metal material; for example, at least of a material selected in the group comprising: aluminum, nylon, steel, cast iron. For example, the main body 17 and head 18 can be made of the same material or of distinct materials, for example of aluminum, nylon, steel, cast iron. In a preferred but nonlimiting embodiment, the main body 17 of the container 2 is made at least partially of nylon, while the head 18 is made at least partially of aluminum; such selection can be advantageous for defining semi-submersible filters, in which the submerged part, represented by the main body 17, is made of a plastic material (for example nylon) resistant to corrosion, while the head 18 (element which is not submerged) represents the part destined to fix the filter 1 (for example for fixing it to a circuit or reservoir) and is therefore advantageously made of a material adapted to provide good structural characteristics, for example, of aluminum. Obviously, it is not excluded the possibility of making, for some applications, for example for submerged filters or pressurized filters, a main body 17 and the associated head 18 completely of a structural material, for example of aluminum, or completely of a corrosion-resistant material, for example of plastic.

As hereinbefore briefly discussed, the filter 1 further comprises at least one filtering cartridge 6 representing the element configured for performing the filtering operation and therefore for enabling a selective passage of the hydraulic fluid. The cartridge 6 is engageable inside the container 2 and partitions the housing compartment 3 into a first chamber 3a fluidically communicating with the inlet 4, and a second chamber 3b fluidically communicating with the outlet 5. More particularly, the first chamber 3a directly fluidically communicates with the inlet 4 and is configured for receiving, at the inlet, the fluid to be treated; the second chamber 3b directly fluidically communicates with the outlet 5 and is configured for receiving the treated fluid. The cartridge 6 is configured and positioned for determining the filtering of the hydraulic fluid from the inlet 4 which flows from the first to the second chambers 3a, 3b. More particularly, the cartridge 6 is configured for being inserted inside the main body 17 and engaging the engagement portion 7 of the container 2. In the configuration illustrated in FIG. 25 for example, the filtering cartridge 6 is stably engageable between the engagement portion 7 of the container 2 and the thrusting element 23 which partially acts on the cartridge 6 and partially on the head 18. In the configuration of the container 2 supporting the portions 7 and 35, the filtering cartridge 6 is engaged between the collars 7a and 35a of said engagement portions 7 and 35.

Figure 23:
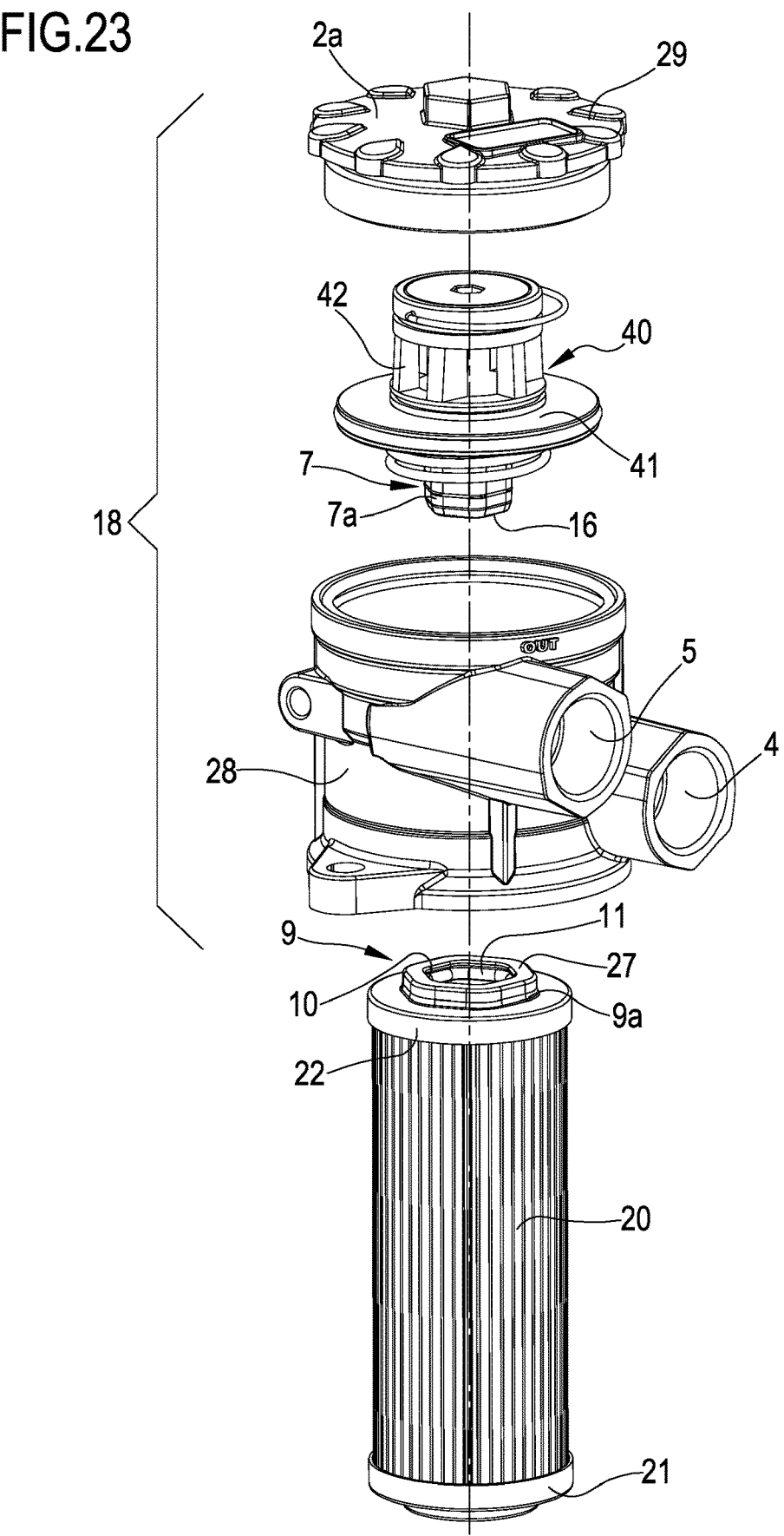
FIG. 23 is a detailed exploded view of the filter in FIG. 20.

Moreover, the head 18 can further comprise an intermediate body 40 (see FIG. 23) configured for being engaged inside the lower body 28. In an assembled condition of the head 18, the intermediate body 40 is closed at the top by the upper body 29 (see FIG. 22). The intermediate body 40 comprises a disk-shaped portion 41 from which emerges a top portion provided with one or more apertures 42 for discharging the fluid from the intermediate body 40. Preferably but in a nonlimiting way, the intermediate body 40 supports the engagement portion 7. The engagement portion 7 extends opposite to the top portion.

The intermediate body 40 is configured for defining, in cooperation with the head 18, a first compartment fluidically communicating with the inlet 4 and a second compartment fluidically communicating with the outlet 5. In the operative conditions of the filter 1, the fluid enters from the inlet 4, flows into the first compartment defined between the intermediate body 40 and lower body 28, then flows into the first chamber 3a by flowing down the container 2, crosses the filtering cartridge 6 (therefore is filtered) and flows up inside the second chamber 3b. By flowing up inside the container 2, the filtered fluid is conveyed inside the engagement portion 7 and therefore inside the intermediate body 40. The fluid exits therefore from the intermediate body 40 through the apertures 42, through the second compartment between the intermediate body 40 and lower body 28 and exits the filter from the outlet 5.

Advantageously, the filtering cartridge 6 exhibits, in a nonlimiting way, a shape substantially countershaped to the container 2; the attached figures schematically show a cartridge 6 having a substantially cylindrical shape and at least partially countershaped to the main body 17. More particularly, the cartridge 6 comprises at least one tubular supporting element 19 extending between a first and second ends 19a, 19b and exhibiting a lateral wall supporting a plurality of through holes. The supporting element 19 advantageously exhibits a hollow cylindrical shape extending along a longitudinal axis; during the engagement condition between the cartridge 6 and container 2, this latter extends along respective longitudinal axes parallel to each other, optionally along parallel and coincident directions. Moreover, the cartridge 6 comprises at least one filtering membrane 20 configured for enabling a fluid to selectively pass through the membrane itself; the membrane 20 is adapted to laterally cover the supporting element 19. The membrane 20 covers the holes of the supporting element 19 and controls the selective passage of the working fluid so that said holes are only crossed by a filtered (purified) fluid. The membrane 20 is engaged around the supporting element 19 in order to define at least one pleated layer. The membrane 20 can comprise only one layer or can comprise a plurality of layers overlappingly wrapped on each other for increasing the filtering capacity of the cartridge 6.

As it is visible in FIGS. 6, 12, 17, 21 and 25 for example, the cartridge 6 further comprises at least one first and one second retaining elements 21, 22 respectively engaged at the first and second ends 19a, 19b of the supporting element 19: the retaining elements 21, 22 substantially define the end elements of the cartridge 6. The first retaining element 21 substantially comprises a lid adapted to stably engage the supporting element 19 at the first end 19a and to temporarily retain the membrane 20: the membrane is fixed, for example by gluing, to the first retaining element 21 which in turn is stably coupled to the element 19.

Figure 5:
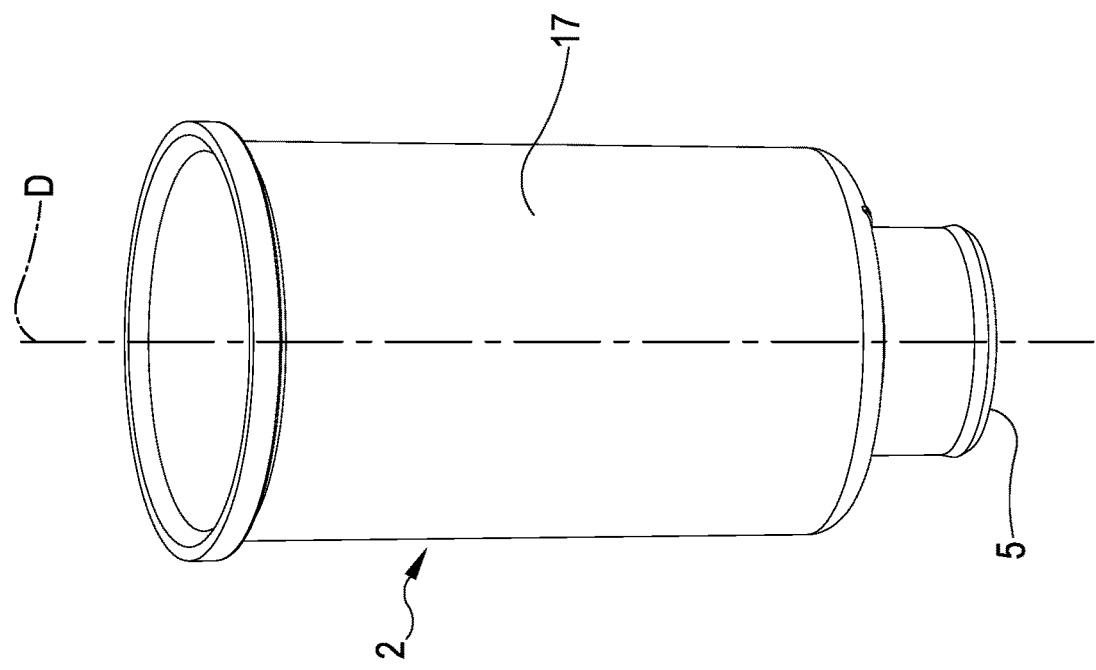
FIG. 5 is a perspective view of a container.
Figure 8:
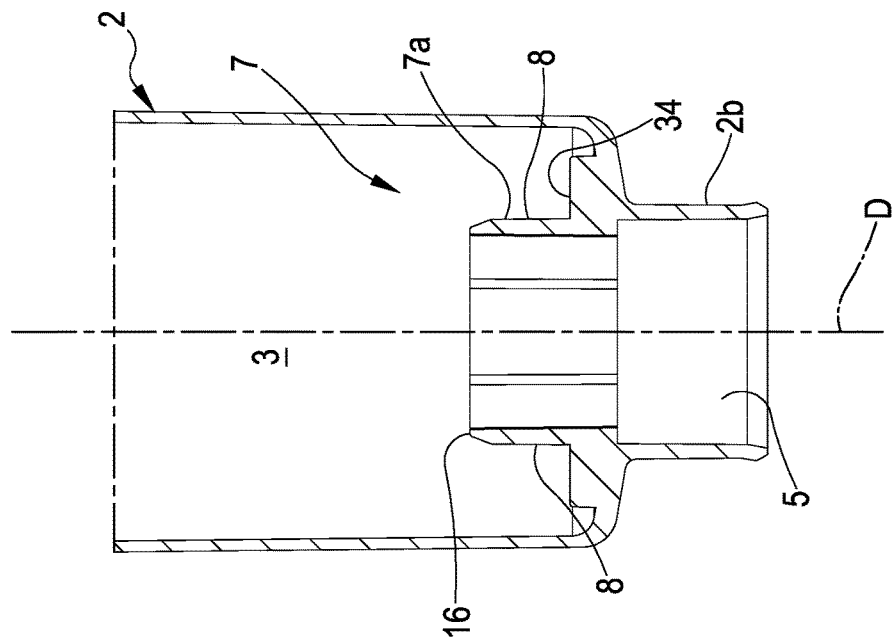
FIG. 8 is a cross-sectional view, along the line VII-VII, of the container in FIG. 7.
Figure 7:
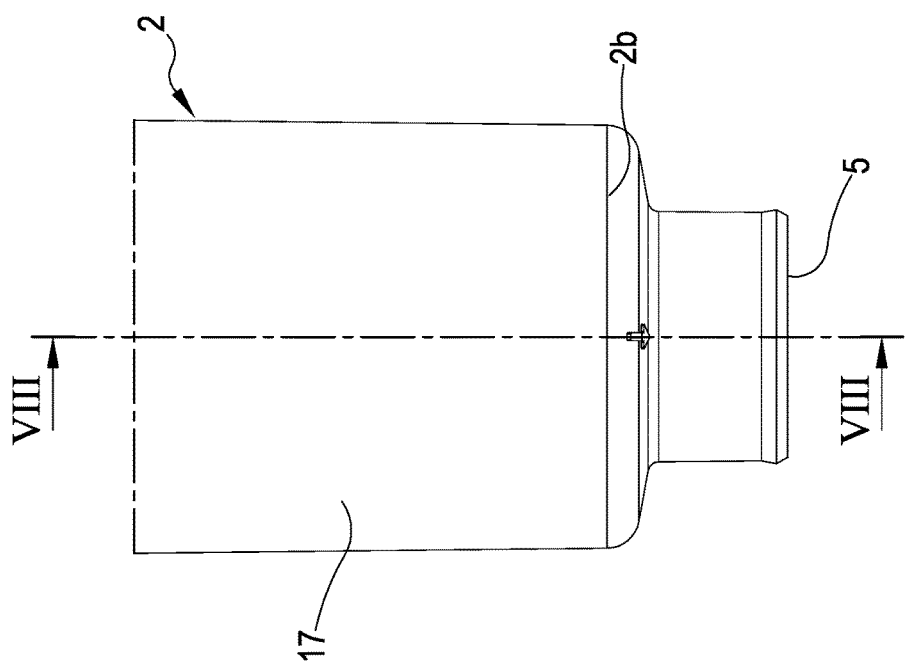
FIG. 7 is a front view of a portion of a container.

In a first embodiment of the cartridge 6 illustrated in FIGS. 6, 12, 17 and 25 for example, the first retaining element 21 substantially comprises a plug which can exhibit at least one centering portion 24 emerging opposite to the element 22 and which is configured for engaging the thrusting element 23 (FIG. 5). Advantageously, the first retaining element 21 further comprises at least one through opening 25 fluidically communicating with an inner volume of the supporting element 19 and in correspondence of which a bypass valve 26 can be positioned. The bypass valve 26 is configured for being placed, under a normally closed condition, in which prevents the fluid communication between the inlet 4 (between the first chamber 3a) and the inner volume of the supporting element 19 (second chamber 3b): under such condition, the fluid entering the filter 1 is constrained to flow through the membrane 20. Further, the bypass valve 26 is configured for being placed in a passage condition wherein it enables the fluid to flow between the inlet 4 (between the first chamber 3a) and the inner volume of the supporting element 19 (second chamber 3b). Switching from the normally closed condition to the passage condition is automatically managed by the valve 26 as the pressure of the hydraulic fluid inside the first chamber 3a increases: indeed, above a determined pressure threshold, the bypass valve opens for enabling the fluid to flow (vent) through the opening 25: an overlapping condition could verify in case the filtering capacity of the membrane 20 is compromised. The bypass valve 26 is, in a nonlimiting way, positioned inside the supporting element 19 and can comprise a check valve adapted to only enable a fluid passage entering the supporting element 19.

Still considering this latter embodiment of the cartridge 6, opposite to the first retaining element 21, the cartridge 6 comprises the second retaining element also adapted to substantially define a lid stably engaged to the supporting element 19 at the second end 19b and configured at least for retaining the membrane 20: therefore the membrane 20 is fixed at the ends, for example by gluing, to the first and second retaining elements 21, 22 which in turn are stably coupled to the supporting element 19. However, in such configuration, the second retaining element 22, unlike the first retaining element 21, comprises a through opening always directly fluidically communicating with the first chamber 3a of the compartment 3 and therefore with the inner volume of the supporting element 19. The second retaining element 22, besides defining the lower fixing element of the membrane 20, is configured for defining the engagement element of the cartridge 6 to the container 2 (see FIGS. 6, 12 and 25, for example). The second retaining element 22 comprises a respective engagement portion 9 defining a respective collar 9a extending along a longitudinal axis which, in an engagement condition between the container 2 and cartridge 6, is parallel to the longitudinal axis D of the container 2. Particularly, the directions are parallel and coincident to each other (the longitudinal axis is the same). More particularly, the longitudinal axis of the engagement portion 9a of the filtering cartridge 6 extends along a longitudinal axis which, under an engagement condition between the container 2 and cartridge 6, is parallel to the longitudinal axis of the outer coupling surface 8 of the container 2.

As it is visible in the attached figures, the collar 9a of the engagement portion 9 of the cartridge 6 comprises an inner lateral coupling surface 10 configured for engaging outside the outer coupling surface 8 of the container 2; more particularly, the inner coupling surface 10 of the engagement portion 9 of the cartridge 6 is countershaped to the outer coupling surface 8 of the container 2, particularly exhibiting a cross-section having a polygonal shape. More specifically, the inner coupling surface 10 of the filtering cartridge 6 can exhibit, along a section transverse to the longitudinal axis of the collar 9a, a simple polygonal section, particularly a regular polygonal one. In a preferred but nonlimiting embodiment, the inner coupling surface 10 exhibits a hexagonal shape.

The inner coupling surface 10 of the collar 9a extends along a respective longitudinal axis which, at least during the engagement condition between the collars 7a and 9a, is substantially parallel to the longitudinal axis of the outer coupling surface 8, optionally parallel to the longitudinal axis D of the container 2. Still more particularly, the inner coupling surface 10 of the filtering cartridge 6 is countershaped to the outer coupling surface 8 of the container 2. As for the previous surfaces, the cross-section is the one along a plane transverse, particularly normal, to the length of the inner coupling surface 10 itself and therefore transverse, optionally normal, to the longitudinal axis D of the container 2.

It is evident that the polygonal configuration, particularly the hexagonal one, of the coupling surfaces 8, 10 respectively of the container 2 and cartridge 6, prevents these latter from reciprocally rotating around an axis parallel to the length of said surfaces. With reference to possible axial movements, these are prevented due to the presence of the thrusting element 23 or a further engagement portion 35 (the embodiment of FIGS. 2 and 25) which exerts a force adapted to hold the engagement portions 7, 9 under a reciprocal coupling condition: the cartridge 6 is prevented from sliding inside the main body 17 of the container 2 at least in the presence of the head 18.

Figure 10:
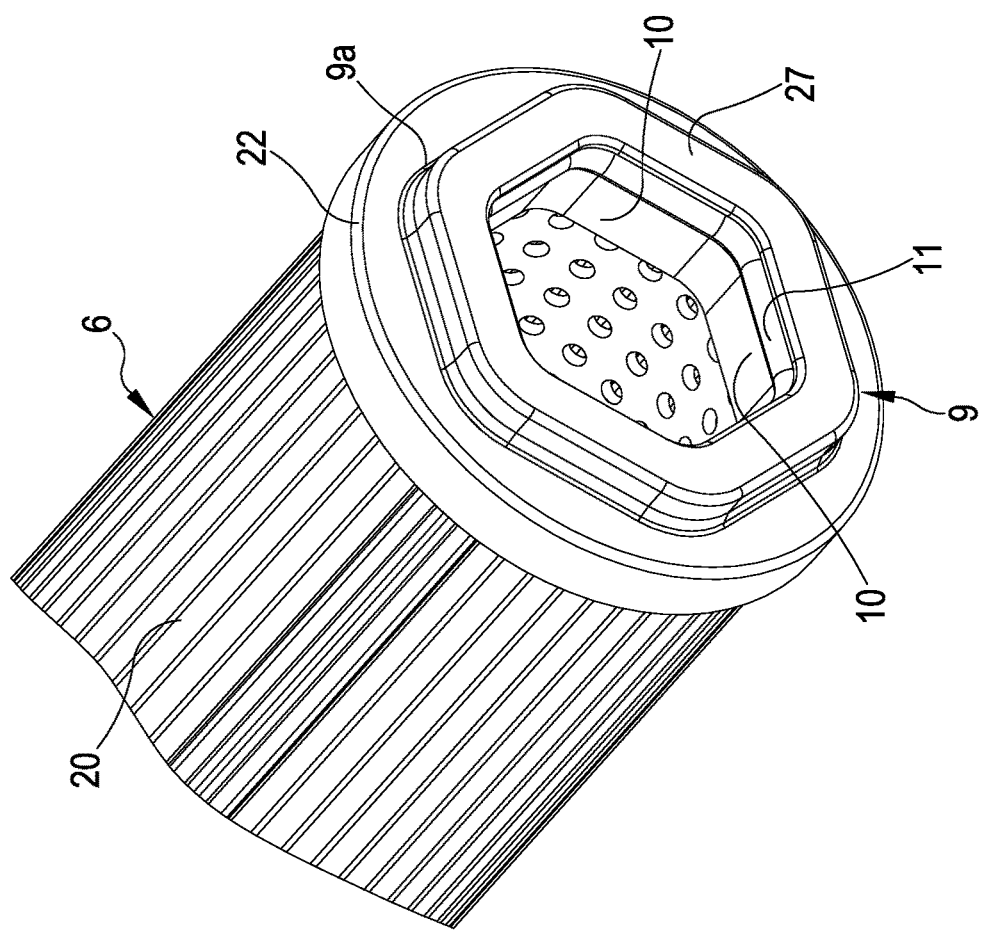
FIG. 10 is a detailed view of a portion of a filtering cartridge.
Figure 13:
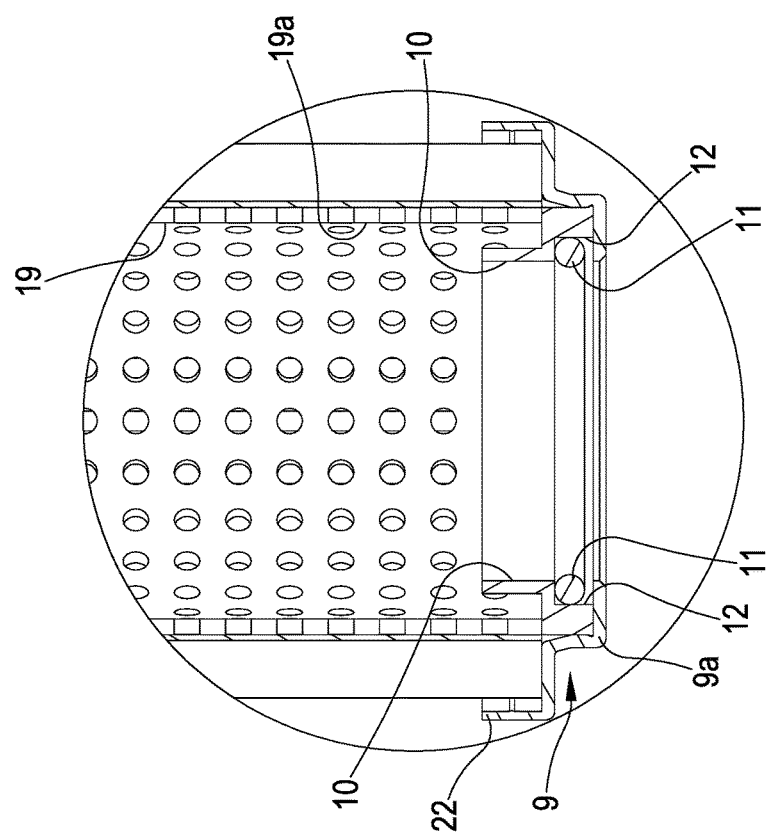
FIG. 13 is a detailed view of the filtering cartridge of FIG. 12.
Figure 15:
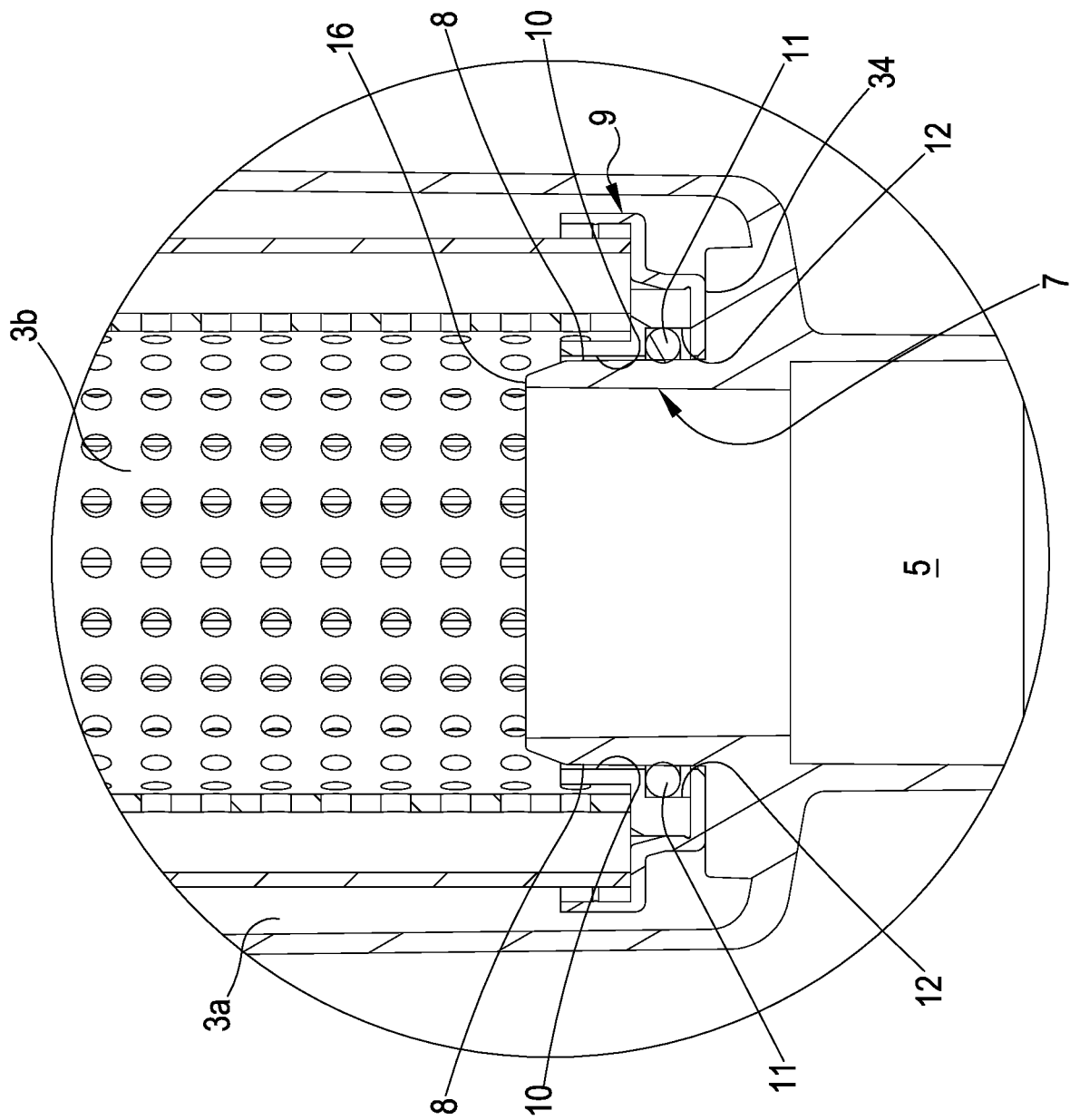
FIG. 15 is a detail of a cross-sectional view of a filter.

Advantageously but in a nonlimiting way, the collar 9a of the filtering cartridge 6 comprises a projection emerging from the second retaining element 22 configured for receiving inside the collar 7a of the container 2. As it is visible for example in FIGS. 10, 12 and 13, the projection defined by the collar 9a is laterally delimited by an outer lateral surface and an inner lateral surface: the coupling surface 10 of the filtering cartridge 6 is defined by at least part of the inner lateral surface of the collar 9a of said filtering cartridge 6. The projection of the collar 9a extends along a direction parallel to the length of the collar 7a and consequently parallel to the longitudinal axis D of the container 2. Advantageously, the collar 9a extends from a base of the second retaining element 22 to a free edge.

Preferably but in a nonlimiting way, the collar 9a comprises a first and second bodies 13, 14 configured for cooperating with each other in order to define the coupling surface 10 and at least one groove configured for housing a seal 11, as it will be better described in the following. Particularly, the first and second bodies 13, 14 are engageable with each other, specifically in a reversible way, along an axial direction parallel to a length of the inner coupling surface 10 of the engagement portion 9 of the filtering cartridge 6 itself. The first body 13 comprises a through opening defining, on the first body itself, part of the inner coupling surface 10 of the filtering cartridge 6. In turn, the second body 14 comprises a respective opening defining, on the second body itself, part of the inner coupling surface 10 of the filtering cartridge. The first and second bodies 13, 14 are configured for engaging, particularly in a reversible way, with each other along an axial direction parallel to a longitudinal axis of the filtering cartridge 6 for defining the coupling surface 10 of the collar 9a of the filtering cartridge 6 itself. Preferably, at least one between the first and second bodies 13, 14 of the collar 9a of the filtering cartridge 6 comprises a groove configured for defining, under the reciprocal coupling condition of the first and second bodies 13, 14, a perimetral cavity 12 of the collar 9a of the filtering cartridge 6 itself.

In a further configuration of the filtering cartridge 6 illustrated in FIG. 2 for example, also the first retaining element 21 comprises an engagement portion 39 substantially similar to the engagement portion 9 of the cartridge itself. The engagement portion 39 of the first retaining element can be identical to the opposite engagement portion 9; unlike the engagement portion 9, the portion 39 of the first retaining element 21 can exhibit an inner coupling surface having a circular shape.

The engagement portion 39 of the first retaining element 21 is configured for engaging the further engagement portion 35 of the container 2. Specifically, the outer coupling surface 36 of the further engagement portion 35 is configured for engaging the inner coupling surface of the engagement portion 39 of the first retaining element 21: the portion 39 is outwardly coupled to the outer coupling surface 36 of the engagement portion 35 of the container. Under the configuration illustrated in FIG. 21, the filter comprises two engagement portions 7 and 35 respectively engaged to the engagement portions 9 and 39 of the filtering cartridge 6.

In a preferred but nonlimiting embodiment, also the engagement portion 39 defined on the first retaining element exhibits a structure identical to the one of the engagement portion 7 wherein the same is defined by the first and second bodies (elements 13 and 14) coupled to each other, particularly in a reversible way, for defining said coupling surface 36.

As it is visible in FIGS. 10, 12, 13 and 17 for example, the filter 1 further comprises at least one seal 11 interposed between the engagement portions 7, 9 respectively of the container 2 and the filtering cartridge 6: the seal 11 forms a closed perimetral element, interposed between the coupling surfaces 8 and 10, configured for defining the fluid tightness between the filtering cartridge 6 and container 2. The attached figures illustrate a nonlimiting configuration of the filter 1, exhibiting only one seal 11; however, it is possible to provide a filter 11 having two or more seals 11.

Advantageously, the seal 11 is stably supported by the collar 3a of the filtering cartridge 6, particularly is supported by the inner lateral surface of the collar 9a (the seal 11 is interposed between the coupling surfaces 8, 10). The inner lateral surface of the collar 9a of the filtering cartridge 6 exhibits a perimetral cavity (FIG. 13) extending all around said collar 9a for defining a closed outline having a substantially "C" shape having the concavity facing the coupling surface itself; the seal 11 is stably engaged at least partially inside said perimetral cavity 12 and partially emerges for contacting the outer coupling surface 8 of the container 2. As it is visible in the attached figures, the seal 11 comprises a body having a shape as the coupling surfaces 8, 10, particularly a polygonal one, specifically countershaped to the inner coupling surface 10 of the collar 9a. Instead, with reference to the cross-section of the seal, this is defined by a circular or elliptical shape.

From the point of view of the materials, the cartridge 6 is also made of metal or plastic material. However, preferentially the cartridge 6 is substantially completely made of plastic material, particularly of nylon, except for the membrane 20. Almost all the components of the cartridge 6 are adapted to contact the working fluid; therefore, it is advantageous that the material of which the cartridge 6 is made, can resist to the chemical attacks of the fluid. Advantageously, the supporting element 19 is made of a plastic and/or metal materials; specifically, the supporting element 19 can be made of at least one of the following materials: nylon, aluminum, steel, cast iron. The supporting element 19 of plastic material is obtainable for example by extrusion or moulding while the supporting element 19 of metal material is obtainable, for example, by calendering and welding. The retaining elements 21 and 22 of the cartridge are advantageously made of a plastic material and are obtained by moulding and/or a metal material and are obtained by chip removal. Particularly, such portions can be made of at least one of the following materials: nylon, aluminum, steel, cast iron. In a nonlimiting embodiment, at least one of the retaining elements, optionally at least the second element 22, is made of plastic material, for example of nylon. Vice versa, the bypass valve 26 could be made at least partially of a plastic and/or metal materials. With reference to the material of the seal 11, this latter is at least made partially, particularly completely, of a plastic material and is obtained by moulding; optionally the seal 11 is made of an elastomeric material, for example at least partially of nylon. A preferred but nonlimiting configuration of the cartridge 6 is one which provides retaining elements 21, 22 of plastic material obtained by moulding.

Process of Making a Filter for Hydraulic Fluids

A process for making the above described filter 1 for hydraulic fluids for hydraulic circuits is described. Firstly, the process comprises providing the container 2 which can be made by moulding or extruding a metal or plastic material. During the step of providing the container 2, it is formed the engagement portion 7 exhibiting an outer coupling surface 8 having a polygonal cross-section, particularly a simple polygonal one, still more particularly a regular polygonal one, optionally a hexagonal shape. In a preferred but nonlimiting embodiment, the main body 17 is made of plastic material and obtained by moulding: during such step, it is obtained the engagement portion 7 as hereinbefore described. Also the head 18 of the container 2 can be made of plastic or metal material therefore, and is obtainable by moulding or melting respectively. The main body 17 and body 18 may be separately made and engaged afterwards for enabling to insert the cartridge 6.

Figure 14:
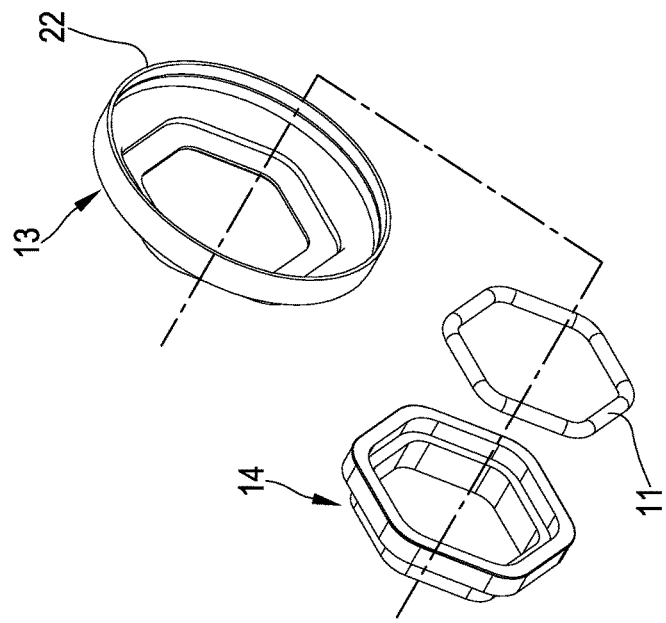
FIG. 14 is an exploded view of a portion of a filtering cartridge.

Moreover, the process provides making the cartridge 6 which comprises the step of making the supporting element 19 which, as hereinbefore described, can be made of plastic or metal material and is obtained by moulding or extrusion. Providing the cartridge 6 comprises forming the engagement portion 9 exhibiting an inner coupling surface 10 at least partially countershaped to the coupling surface 8 of the container 2. As previously discussed, the inner coupling surface 10 can have a cross-section having a simple polygonal shape, particularly a regular polygonal shape, still more particularly a hexagonal one. Providing the cartridge 6 further comprises providing a first and second bodies 13, 14 of the collar 9a of the engagement portion 9 (see FIG. 14) as hereinbefore described. The first and second bodies 13, 14 exhibit a respective through opening. A perimetral groove configured for receiving the seal 11 is defined on one of the two bodies 13, 14. Providing the cartridge 6 further comprises forming the retaining element 21 and 22. Such portions are made by moulding plastic materials or by melting metal materials. Advantageously, the elements 21 and 22 are made of a plastic material and are obtained by moulding; during such step, the opening 25 and the centering portion 24 for the second element 21 and the engagement portion 9 for the second retaining element 22 are formed. Moreover, the process provides a step of forming the seal 11 of the above described type; particularly, the seal 11 has a polygonal type closed outline and is countershaped to the inner coupling surface 10 of the filtering cartridge. Preferably, the seal 11 exhibits a circular cross-section.

Moreover, providing the cartridge 6 comprises engaging the membrane 20 around the supporting element 19; such step consists of positioning the membrane 20 around the lateral wall of the element 19 so that this latter is pleated around this latter. Then, the elements 21 and 22 are coupled to the ends of the supporting element 19 and the membrane 20 is glued to said elements 21 and 22.

The process then provides the step of assembling the filter 1, which provides to insert the cartridge inside the main body 17, the second retaining element 22 facing the outlet 5. Upon centering the cartridge 6, this latter is further thrusted inside the body 17 in order to define the engagement between the portions 7 and 9 respectively of the container 2 and cartridge 6: the step of coupling the surfaces 8 and 10. The process provides engaging the seal 11 between the engagement portions 7 and 9. Specifically, the seal 11 is engaged inside the groove of the first and/or second bodies 13, 14. Now, it is useful to observe the first and second bodies 13, 14 are aligned so that the respective openings are aligned in order to define the inner coupling surface 10 of the collar 9a of the filtering cartridge 6. The step of centering the cartridge enables to orient the collar 9a so that, for engaging the portions 7 and 9, it is only necessary to relatively axially move the container and cartridge. Then, centering and engaging the cartridge to the container prevent any rotational movement of these elements.

Upon engaging the cartridge 6, the process provides to position the thrusting element 23 between the cartridge 6 and head 18 and then to fix this latter to the main body 17. The step of fixing the head 18 thrusts the element 23 against the cartridge which is therefore axially retained against the engagement portion 7 of the container 2; then, therefore fixing the head 18 to the body 17 prevents any relative (both axial and rotational) movement of the container 2 and cartridge 6.

ADVANTAGES

Advantages with respect to the filters belonging to the state of the art are described. The filter 1 exhibits the coupling surfaces 8, 10 having a polygonal shape, which prevent the relative rotation between the container and cartridge. Moreover, the presence of the coupling surfaces 8, 10 having respective polygonal cross-sections and particularly a hexagonal one, enables to define a highly stable coupling between the container 2 and cartridge 6, by advantageously evenly distributing the stresses. Moreover, providing the coupling surfaces 8, 10 having respective polygonal cross-sections enables to define different engagement positions (operative positions) of the cartridge to the container, in order to enable a fast and simplified assembly of the filter 1. A further advantage is defined by the simple manufacture of the filter 1 which therefore is readily assembled; the structure of all the components ensures to correctly position the seal 11 between the coupling surfaces 8 and 10 so that a correct tightness and consequently an efficient filtering are ensured. Simplifying the assembly step makes particularly easy the step of making the same and possibly to disassemble it, which in turn reduces at the minimum the cost for manufacturing the filter 1.

What is claimed is:

1. A filter for hydraulic fluids, the filter comprising:
   a container exhibiting inside a housing compartment fluidically communicating with an inlet and an outlet associated with said container;
   a filtering cartridge engageable with the container inside the housing compartment, the filtering cartridge partitioning the housing compartment in a first chamber fluidically communicating with the inlet and a second chamber fluidically communicating with the outlet, the filtering cartridge being configured and positioned for filtering the hydraulic fluid flowing from the first chamber to the second chamber;
   the container exhibiting an engagement portion projecting inside the housing compartment and defining a collar having an outer coupling lateral surface;
   the filtering cartridge exhibiting a respective engagement portion defining a respective collar exhibiting an inner coupling lateral surface configured for engaging outside the outer coupling surface of the container;
   the outer coupling surface of the engagement portion of the container exhibiting, along a cross-section, a polygonal shape;
   the inner coupling surface of the engagement portion of the cartridge exhibiting, along a cross-section, a polygonal shape and being countershaped to the outer coupling surface of the container, said outer and inner coupling surfaces being configured for cooperating with each other to define a removable engagement between the filtering cartridge and the container; and
   a polygonal seal comprising a body defining a closed perimetral element having a polygonal perimetral shape countershaped to the inner coupling surface of the filtering cartridge, the seal being interposed between the engagement portions of the container and the filtering cartridge, respectively, the polygonal seal being configured for defining the fluid tightness between the engagement portions of the container and the filtering cartridge, respectively, wherein the polygonal seal is stably supported by the collar of the filtering cartridge and is interposed between the outer coupling surface and the inner coupling lateral surface both having the polygonal shape,
   wherein the container comprises a body and defines a longitudinal axis, and the collar of the container extends in an axial direction from a surface of the body of the container into the housing compartment, wherein the collar of the container defines a longitudinal axis that is aligned with the longitudinal axis of the container, and
   wherein the collar of the filtering cartridge extends in a longitudinal direction, parallel to the longitudinal axis of the collar of the container.

2. The filter according to claim 1, wherein the outer coupling surface of the engagement portion of the container exhibits, along a cross-section, a regular polygonal shape exhibiting a number of sides equal to or greater than four, and wherein the inner coupling surface of the coupling portion of the filtering cartridge exhibits, according to a cross-section, a regular polygonal shape exhibiting a number of sides equal to or greater than four.

3. The filter according to claim 1, wherein the outer coupling surface of the engagement portion of the container exhibits, along a cross-section, a hexagonal shape, and wherein the inner coupling surface of the engagement portion of the filtering cartridge exhibits, along a cross-section, a hexagonal shape.

4. The filter according to claim 1, wherein the collar of the cartridge comprises an inner lateral wall delimiting inside said collar, at least part of the inner lateral wall of the collar of the cartridge defining the inner coupling surface of the collar of the cartridge, the inner lateral wall of the collar of the filtering cartridge comprising a perimetral cavity extending around said collar to define a closed outline, the seal being stably engaged at least partially inside said perimetral cavity, the seal being configured for contacting the outer coupling surface of the container engagement portion.

5. The filter according to claim 1, wherein the filtering cartridge comprises:
a tubular supporting element extending between a first end of the supporting element and a second end of the supporting element and exhibiting a lateral wall exhibiting a plurality of through holes;
a filtering membrane engaged around the lateral wall of the supporting element and configured for enabling the selective passage of a fluid through the membrane itself; and
first and second retaining elements respectively engaged at the first end of the supporting element and the second end of the supporting element,
wherein at least one of the first and second retaining elements of the filtering cartridge comprises the respective engagement portion supporting the respective collar.

6. The filter according to claim 1, wherein the collar of the engagement portion of the cartridge comprises a first body and one second body engageable with each other along an axial direction parallel to a length of the inner coupling surface of the engagement portion of the filtering cartridge itself,
the first body comprising a through opening defining, on the first body itself, part of the inner coupling surface of the filtering cartridge,
the second body comprising a respective opening defining on the second body itself, part of the inner coupling surface of the filtering cartridge, and
the first and second bodies being configured for engaging with each other along an axial direction parallel to a longitudinal axis of the filtering cartridge for defining the coupling surface of the collar of the filtering cartridge itself.

7. The filter according to claim 1, wherein the outer coupling surface of the collar of the container exhibits a first section extending inside the cartridge parallel to the longitudinal axis of the container, the outer coupling surface of the container exhibits a second section extending inside the cartridge, without interruption, with respect to the first section, the outer coupling surface of the second section being sloped with respect to the longitudinal axis of the container and converging according to a direction entering the filtering cartridge.

8. The filter according to claim 7, wherein the outer coupling surface of the collar of the container is sloped with respect to the longitudinal axis of the container with an angle between 1° and 5°.

9. A filter for hydraulic fluids, the filter comprising:
a container exhibiting inside a housing compartment fluidically communicating with an inlet and an outlet associated with said container; and
a filtering cartridge engageable with the container inside the housing compartment, the filtering cartridge partitioning the housing compartment in a first chamber fluidically communicating with the inlet and a second chamber fluidically communicating with the outlet, the filtering cartridge being configured and positioned for filtering the hydraulic fluid flowing from the first chamber to the second chamber;
the container exhibiting an engagement portion projecting inside the housing compartment and defining a collar having an outer coupling lateral surface, wherein the container comprises a body and defines a longitudinal axis, and said collar of the container extends axially from a surface of the body of the container into the housing compartment wherein the collar of the container defines a longitudinal axis that is aligned with the longitudinal axis of the container;
the filtering cartridge exhibiting a respective engagement portion defining a respective collar exhibiting an inner coupling lateral surface configured for engaging outside the outer coupling surface of the container, wherein the collar of the filtering cartridge extends in a longitudinal direction, parallel to the longitudinal axis of the collar of the container;
the outer coupling surface of the engagement portion of the container exhibiting, along a cross-section, a polygonal shape, the inner coupling surface of the engagement portion of the cartridge being at least partially countershaped to the outer coupling surface of the container, said outer and inner coupling surfaces being configured for cooperating with each other to define a removable engagement between the filtering cartridge and the container;
the collar of the engagement portion of the cartridge comprising a first body and a second body engageable with each other along an axial direction parallel to a length of the inner coupling surface of the engagement portion of the filtering cartridge itself;
the first body comprising a through opening defining, on the first body itself, part of the inner coupling surface of the filtering cartridge; and
the second body comprising a respective opening defining on the second body itself, part of the inner coupling surface of the filtering cartridge, the first and second bodies being configured for engaging with each other along an axial direction parallel to a longitudinal axis of the filtering cartridge for defining the coupling surface of the collar of the filtering cartridge itself,
wherein the filter further comprises a seal interposed between the engagement portions of the container and the filtering cartridge, respectively, the seal comprising a closed perimetral element having a polygonal perimetral shape and configured for defining the fluid tightness between the engagement portions of the container and the filtering cartridge, respectively, wherein the seal is stably supported by the collar of the filtering cartridge and is interposed between the outer and inner coupling surfaces of the container and the filtering cartridge, respectively, wherein the collar of the cartridge comprises an inner lateral wall delimiting inside said collar, at least part of the inner lateral wall of the collar of the cartridge defining the inner coupling surface of the collar of the cartridge, the inner lateral wall of the collar of the filtering cartridge comprising a perimetral cavity extending around said collar to define a closed outline, the seal being stably engaged at least partially inside said perimetral cavity, the seal being configured for contacting the outer coupling surface of the container engagement portion, and wherein at least one of the first and second bodies comprises a groove configured for defining, under the reciprocal coupling of the first and second bodies, the perimetral cavity of the collar of the filtering cartridge itself.

10. The filter according to claim 9, wherein the inner coupling surface of the filtering cartridge is countershaped to the outer coupling surface of the container.

11. The filter according to claim 9, wherein the outer coupling surface of the engagement portion of the container exhibits, along a cross-section, a regular polygonal shape exhibiting a number of sides equal to or greater than 4, and wherein the inner coupling surface of the coupling portion of the filtering cartridge exhibits, according to a cross-section, a regular polygonal shape exhibiting a number of sides equal to or greater than 4.

12. The filter according to claim 9, wherein the outer coupling surface of the engagement portion of the container exhibits, along a cross-section, a hexagonal shape, and
wherein the inner coupling surface of the engagement portion of the filtering cartridge exhibits, along a cross-section, a hexagonal shape.

13. The filter according to claim 1, wherein the collar of the container extends into the housing compartment directly from a surface of the body of the container that is normal to the longitudinal axis of the container.

14. The filter according to claim 1, wherein the container and the engagement portion are formed in one piece.

15. The filter according to claim 1, wherein one or more walls of the container and the engagement portion of the container comprise a single body.

16. The filter according to claim 1, wherein the outer coupling surface of the collar engagement portion of the container defines a closed outline.

17. The filter according to claim 1, wherein the outer coupling lateral surface of the collar is a continuous surface.

18. The filter according to claim 1, wherein the collar engagement portion of the container is integral with, and extends from, the body of the container, wherein the body comprises a tubular shaped portion, and wherein the collar of the container is configured such that, when the inner coupling lateral surface of the filtering cartridge is slid into engagement with the outer coupling lateral surface of the container, the filtering cartridge is inside the tubular-shaped portion of the body of the container.

19. The filter according to claim 1,
wherein the body of the polygonal seal is made of moulded plastic and comprises a series of straight portions and curved portions that alternate with one another to form a closed polygonal loop, and
wherein an inner surface of closed polygonal loop of the polygonal seal engages the polygonal outer coupling lateral surface of the collar of the container when the polygonal inner coupling lateral surface of the collar of the filtering cartridge and the polygonal outer coupling lateral surface of the collar of the container are coupled with one another.

20. The filter according to claim 1, wherein the polygonal seal is interposed between the collar of the container and collar of the filtering cartridge at an intermediate location along the polygonal coupling lateral surface of one of the collars such that, when the filtering cartridge is installed in the container, the polygonal seal slidably engages with the countershaped polygonal coupling lateral surface of the other one of the collars.

* * * * *